(12) United States Patent
Guo et al.

(10) Patent No.: US 12,430,708 B2
(45) Date of Patent: Sep. 30, 2025

(54) IMAGE DISPLAY METHOD, INTELLIGENT VEHICLE, STORAGE MEDIUM, AND APPARATUS FOR ADJUSTING AN IMAGE BASED ON MOTION INFORMATION

(71) Applicant: Shenzhen Yinwang Intelligent Technologies Co., Ltd., Shenzhen (CN)

(72) Inventors: Linchuan Guo, Nanjing (CN); Xinyao Jin, Nanjing (CN); Guicheng Zhang, Nanjing (CN)

(73) Assignee: SHENZHEN YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 106 days.

(21) Appl. No.: 18/156,827

(22) Filed: Jan. 19, 2023

(65) Prior Publication Data
US 2023/0153942 A1 May 18, 2023

Related U.S. Application Data

(63) Continuation of application No. PCT/CN2020/103750, filed on Jul. 23, 2020.

(51) Int. Cl.
| | |
|---|---|
| *G06T 3/40* | (2024.01) |
| *B60K 35/00* | (2006.01) |
| *G06T 3/20* | (2006.01) |
| *B60K 35/22* | (2024.01) |

(52) U.S. Cl.
CPC .............. *G06T 3/40* (2013.01); *B60K 35/00* (2013.01); *G06T 3/20* (2013.01); *B60K 35/22* (2024.01); *B60K 2360/21* (2024.01)

(58) Field of Classification Search
CPC .. G06T 3/40; G06T 3/20; B60K 35/00; B60K 2360/21; B60K 35/22
See application file for complete search history.

(56) References Cited

U.S. PATENT DOCUMENTS

| | | | |
|---|---|---|---|
| 7,903,166 B2* | 3/2011 | Daly | G06T 5/80 348/208.1 |
| 2009/0002142 A1 | 1/2009 | Morimoto et al. | |
| 2011/0181724 A1* | 7/2011 | Kadowaki | B62D 15/0275 348/148 |
| 2014/0225920 A1* | 8/2014 | Murata | G02B 27/017 345/633 |

(Continued)

FOREIGN PATENT DOCUMENTS

| | | |
|---|---|---|
| CN | 100443334 C | 12/2008 |
| CN | 105094310 A | 11/2015 |

(Continued)

*Primary Examiner* — Terrell M Robinson
(74) *Attorney, Agent, or Firm* — Conley Rose, P.C.

(57) ABSTRACT

An image display method includes obtaining motion information of a vehicle, where the motion information includes first information or an upper-layer advanced driver assistant system (ADAS) instruction, where the first information includes one or two of displacement information of a brake pedal and displacement information of an acceleration pedal, and the ADAS instruction is used to instruct the vehicle to travel at an accelerated speed or at a decelerated speed; and zooming in or zooming out a first image based on the motion information of the vehicle, where the first image is an image displayed on a vehicle-mounted display of the vehicle.

20 Claims, 13 Drawing Sheets

(56) References Cited

U.S. PATENT DOCUMENTS

| | | | | |
|---|---|---|---|---|
| 2015/0363656 A1* | 12/2015 | Brauer | ................... | G06V 20/56 |
| | | | | 348/77 |
| 2019/0311559 A1* | 10/2019 | Bigio | ................... | G07C 5/0841 |
| 2020/0086791 A1* | 3/2020 | Hardy | ................... | G06T 3/4038 |
| 2021/0318539 A1* | 10/2021 | Profendiner | ......... | G02B 27/017 |
| 2023/0086164 A1* | 3/2023 | Hayashi | ............. | G02B 27/0179 |
| | | | | 345/647 |

FOREIGN PATENT DOCUMENTS

| | | | |
|---|---|---|---|
| CN | 105835776 | A | 8/2016 |
| CN | 107128264 | A | 9/2017 |
| CN | 110139141 | A | 8/2019 |
| WO | 2020026825 | A1 | 2/2020 |

* cited by examiner

IMAGE DISPLAY METHOD, INTELLIGENT VEHICLE, STORAGE MEDIUM, AND APPARATUS FOR ADJUSTING AN IMAGE BASED ON MOTION INFORMATION

CROSS-REFERENCE TO RELATED APPLICATIONS

This application is a continuation application of International Patent Application No. PCT/CN2020/103750, filed on Jul. 23, 2020, the disclosure of which is hereby incorporated by reference in its entirety.

TECHNICAL FIELD

This application relates to the field of image data processing, and in particular, to an image display method, a vehicle, and a storage medium.

BACKGROUND

With development of society, automobiles have become a common and important means of transportation in people's work and life. In order to increase the interest of passengers' journeys, the automobiles are usually equipped with vehicle-mounted displays to play videos. However, some people may get carsick when watching the videos in the automobiles.

To alleviate passengers' carsickness, a specific field of view may be provided for passengers, so that the passengers can predict external motion information. For example, a camera is used to shoot a driver's field of view, and the obtained driver's field of view is displayed on the vehicle-mounted display. This improves passengers' capability of predicting road conditions. However, in this manner, a visible area of the passenger is limited, resulting in a poor final effect. Therefore, how to alleviate a situation in which passengers get carsick or are tired when watching videos on vehicles needs to be resolved urgently.

SUMMARY

Embodiments of this application provide an image display method, to alleviate a situation in which a passenger gets carsick or is tired when watching a video on a vehicle.

To achieve the foregoing objective, embodiments of this application provide the following technical solutions.

It should be understood that the image display method provided in this application may be performed by an electronic apparatus. The electronic apparatus may be an image display apparatus, for example, may be an entire computing device, or may be some components in this computing device, for example, a chip related to image display. In an example, the electronic apparatus may be a terminal such as an automobile or a vehicle-mounted display in an automobile, or may be a system chip that can be disposed in a terminal. The system chip is also referred to as a system on chip, or referred to as a system on a chip (SoC) chip. In physical implementation, a navigation chip may be integrated inside the system chip, or may not be integrated with the system chip.

A first aspect of this application provides an image display method, including obtaining motion information of a vehicle, where the motion information includes at least one of first information, an upper-layer advanced driver assistant system (ADAS) instruction, and a predicted motion track of the vehicle, the first information includes at least one of displacement information of a brake pedal, displacement information of an acceleration pedal, and steering wheel angle information, and the ADAS instruction is used to instruct the vehicle to travel at an accelerated speed, travel at a decelerated speed, or travel at a turning. For example, the motion information may include the displacement information of the brake pedal, or the motion information may include the displacement information of the acceleration pedal, or the motion information may include the displacement information of the brake pedal and the displacement information of the acceleration pedal, or the motion information may include the ADAS instruction, or the motion information may include the displacement information of the brake pedal and the ADAS instruction, or the motion information may include the displacement information of the acceleration pedal and the ADAS instruction, or the motion information may include the displacement information of the brake pedal, the displacement information of the acceleration pedal, and the ADAS instruction. For example, for a non-autonomous vehicle, the motion information may include the first information. For an autonomous vehicle, the motion information may include the first information or the upper-layer ADAS instruction. For example, when the vehicle is in a manual driving mode, the motion information may include the first information. When the vehicle is in an autonomous mode, the motion information may include the ADAS instruction. The manual driving mode mentioned in this application below is used to indicate a scenario in which a driver controls a vehicle, including a non-autonomous vehicle. Details are not described below again. The method further includes adjusting the first image based on the motion information of the vehicle. For example, when the vehicle travels at the accelerated speed, the first image is zoomed in; or when the vehicle travels at the decelerated speed, the first image is zoomed out; or other adjustments may be performed on the first image based on the motion information of the vehicle, for example, curvature adjustment, resolution adjustment, or brightness adjustment are performed on the first image based on the motion information. It can be learned from the first aspect that, in the solution provided in this application, a size of the first image may be adjusted based on the motion information of the vehicle, so that images move dynamically relative to eyes. Therefore, signals transmitted by a vestibular system to a central nerve of a brain are motion signals, and images of a vehicle-mounted display that are seen by a passenger are also moving. Therefore, signals transmitted by passenger's eyes to the central nerve of the brain are also motion signals. Therefore, there is no great difference between the signals transmitted by the vestibular system to the central nerve of the brain and the signals transmitted by the eyes to the central nerve of the brain. This does not affect cognitive balance of the brain and alleviates a problem that the passenger may get carsick when watching a video on the vehicle. In addition, a signal received by using another sensor or a gyroscope has occurred. A person has synchronously sensed the motion information, and then the motion information is fed back to the display with a very large delay. As a result, an effect is very poor. In this application, the first image is adjusted based on the displacement information of the brake pedal, the displacement information of the acceleration pedal, and the ADAS instruction, thereby reducing the delay and better relieving passenger's carsickness.

Optionally, with reference to the foregoing first aspect, in a first possible implementation, the adjusting the first image based on the motion information of the vehicle includes performing zooming adjustment on the first image based on the motion information of the vehicle. It should be noted that zooming adjustment may be performed on the entire image of the first image based on the motion information of the vehicle, or zooming adjustment may be performed only on a part of an area of the first image. For example, because a target object or an object of the image concerned by the passenger is usually located in a center of the first image, zooming adjustment may be performed only on the central area of the first image.

Optionally, with reference to the first aspect or the first possible implementation of the first aspect, in a second possible implementation, the adjusting the first image based on the motion information of the vehicle further includes moving a boundary of the first image based on the motion information of the vehicle. It should be noted that one or more boundaries of the first image or some boundaries of the first image may be moved based on the motion information of the vehicle.

Optionally, with reference to the first aspect, the first possible implementation of the first aspect, or the second possible implementation of the first aspect, in a third possible implementation, the performing zooming adjustment on the first image based on the motion information of the vehicle includes zooming in the first image based on a first acceleration, where a zoom-in proportion of the first image is determined based on the first acceleration and first duration, the first acceleration is determined based on the displacement information of the acceleration pedal, and the first duration is duration from a time when the displacement information of the acceleration pedal is obtained to a time when the vehicle travels at a constant speed. It can be learned from the first possible implementation of the first aspect that a specific manner of adjusting the first image in an acceleration scenario is provided, thereby increasing diversity of the solution.

Optionally, with reference to the third possible implementation of the first aspect, in a fourth possible implementation, the zoom-in proportion of the first image is determined based on the first acceleration, the first duration, and a preset first compression function, and the first compression function is used to simulate a curve in which the first acceleration of the vehicle within a preset distance range changes with time. It can be learned from the second possible implementation of the first aspect that, the first compression function is used to determine the zoom-in proportion of the first image, and the first compression function may simulate the curve in which the first acceleration of the vehicle within the preset distance range changes with time, so that a better zoom-in proportion can be obtained.

Optionally, with reference to the first aspect, the first possible implementation of the first aspect, or the second possible implementation of the first aspect, in a fifth possible implementation, the performing zooming adjustment on the first image based on the motion information of the vehicle includes zooming out the first image based on a second acceleration, where a zoom-out proportion of the first image is determined based on the second acceleration and second duration, the second acceleration is determined based on the displacement information of the brake pedal, and the second duration is duration from a time when the displacement information of the brake pedal is obtained to a time when the vehicle travels at a constant speed. It can be learned from the third possible implementation of the first aspect that a specific manner of adjusting the first image in a deceleration scenario is provided, thereby increasing diversity of the solution.

Optionally, with reference to the fifth possible implementation of the first aspect, in a sixth possible implementation, the zoom-out proportion of the first image is determined based on the second acceleration, the second duration, and a preset second compression function, and the second compression function is used to simulate a curve in which the second acceleration of the vehicle within a preset distance range changes with time.

Optionally, with reference to the first aspect or the first to the sixth possible implementations of the first aspect, in a seventh possible implementation, the performing zooming adjustment on the first image based on the motion information of the vehicle further includes moving down an upper boundary of the first image when it is detected that the vehicle travels to a first road section, where the first road section is an uphill road section on which the vehicle travels in front of the vehicle and that is predicted based on navigation information of the vehicle and a high-precision map, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section. It can be learned from the fifth possible implementation of the first aspect that a specific manner of adjusting the first image in an uphill scenario is provided, thereby increasing diversity of the solution.

Optionally, with reference to the first aspect or the first to the sixth possible implementations of the first aspect, in an eighth possible implementation, the performing zooming adjustment on the first image based on the motion information of the vehicle includes moving down an upper boundary of the first image when it is detected that the vehicle travels to a first road section, where the first road section is an uphill road section on which the vehicle travels in front of the vehicle and that is predicted based on data obtained by an image sensor of the vehicle, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

Optionally, with reference to the first aspect or the first to the sixth possible implementations of the first aspect, in a ninth possible implementation, the performing zooming adjustment on the first image based on the motion information of the vehicle further includes moving up a lower boundary of the first image when it is detected that the vehicle travels to a second road section, where the second road section is a downhill road section on which the vehicle travels in front of the vehicle and that is predicted based on navigation information of the vehicle and a high-precision map, a proportion of moving up the lower boundary of the first image is determined based on gravity acceleration and fourth duration, and the fourth duration is duration for the vehicle to travel through the second road section. It can be learned from the sixth possible implementation of the first aspect that a specific manner of adjusting the first image in a downhill scenario is provided, thereby increasing diversity of the solution.

Optionally, with reference to the first aspect or the first to the sixth possible implementations of the first aspect, in a tenth possible implementation, the performing zooming adjustment on the first image based on the motion information of the vehicle includes moving up a lower boundary of the first image when it is detected that the vehicle travels to a second road section, where the second road section is a downhill road section on which the vehicle travels in front of the vehicle and that is predicted based on data obtained by an image sensor of the vehicle, a proportion of moving up the lower boundary of the first image is determined based on gravity acceleration and fourth duration, and the fourth duration is duration for the vehicle to travel through the second road section.

Optionally, with reference to the first aspect or the first to the tenth possible implementations of the first aspect, in an eleventh possible implementation, the performing zooming adjustment on the first image based on the motion information of the vehicle includes moving a left boundary of the first image to the right when it is determined, based on the steering wheel angle information, that the vehicle turns left, where a proportion of moving the left boundary to the right is determined based on a second rate and fifth duration, the second rate is a rate of the vehicle when it is determined, based on the steering wheel angle information, that the vehicle turns left, and the fifth duration is duration, determined based on the steering wheel angle information, from a time when the vehicle turns left to a time when the vehicle stops turning left; or moving a right boundary of the first image to the left when it is determined, based on the steering wheel angle information, that the vehicle turns right, where a proportion of moving the right boundary to the left is determined based on a third rate and sixth duration, the third rate is a rate of the vehicle when it is determined, based on the steering wheel angle information, that the vehicle turns right, and the sixth duration is duration, determined based on the steering wheel angle information, from a time when the vehicle turns right to a time when the vehicle stops turning left. It can be learned from the seventh possible implementation of the first aspect that a specific manner of adjusting the first image in a turning scenario is provided, thereby increasing diversity of the solution.

Optionally, with reference to the first aspect or the first to the tenth possible implementations of the first aspect, in a twelfth possible implementation, the performing zooming adjustment on the first image based on the motion information of the vehicle includes moving a left boundary of the first image to the right when it is detected that the vehicle travels to a third road section, where the third road section is a left-turn road section on which the vehicle travels in front of the vehicle and that is predicted based on data obtained by the image sensor of the vehicle, a proportion of moving the left boundary to the right is determined based on a second rate and fifth duration, the second rate is a rate of the vehicle when the vehicle travels to the third road section, and the fifth duration is duration for the vehicle to travel through the third road section; or moving a right boundary of the first image to the left when it is detected that the vehicle travels to a fourth road section, where the fourth road section is a right-turn road section on which the vehicle travels in front of the vehicle and that is predicted based on data obtained by the image sensor of the vehicle, a proportion of moving the right boundary to the left is determined based on a third rate and sixth duration, the third rate is a rate of the vehicle when the vehicle travels to the fourth road section, and the sixth duration is duration for the vehicle to travel through the fourth road section.

Optionally, with reference to the first aspect, in a thirteenth possible implementation, the adjusting the first image based on the motion information of the vehicle includes zooming in the first image based on a third acceleration when it is determined, according to a first ADAS instruction, that the vehicle travels at the accelerated speed, where a zoom-in proportion of the first image is determined based on the third acceleration and seventh duration, the third acceleration is determined according to the first ADAS instruction, the seventh duration is duration from a time when the vehicle travels at the accelerated speed that is determined according to the first ADAS instruction to a time when the vehicle travels at a constant speed, and the first ADAS instruction is used to instruct the vehicle to accelerate; zooming out the first image based on a fourth acceleration when it is determined, according to a second ADAS instruction, that the vehicle travels at the decelerated speed, where a zoom-out proportion of the first image is determined based on the fourth acceleration and eighth duration, the fourth acceleration is determined according to the second ADAS instruction, the eighth duration is duration from a time when the vehicle travels at the decelerated speed that is determined according to the second ADAS instruction to a time when the vehicle travels at the constant speed, and the second ADAS instruction is used to instruct the vehicle to decelerate; moving a left boundary of the first image to the right when it is determined, according to a third ADAS instruction, that the vehicle turns left, where a proportion of moving the left boundary to the right is determined based on a second rate and fifth duration, the second rate is a rate of the vehicle when the vehicle turns left, and the fifth duration is duration in which the vehicle turns left; or moving a right boundary of the first image to the left when it is determined, according to a fourth ADAS instruction, that the vehicle turns right, where a proportion of moving the right boundary to the left is determined based on a third rate and sixth duration, the third rate is a rate of the vehicle when the vehicle turns right, and the sixth duration is duration in which the vehicle turns right.

A second aspect of this application provides an image display apparatus, including an obtaining module, configured to obtain motion information of a vehicle, where the motion information includes at least one of first information, an upper-layer ADAS instruction, and a predicted motion track of the vehicle, the first information includes at least one of displacement information of a brake pedal and displacement information of an acceleration pedal, and the ADAS instruction is used to instruct the vehicle to travel at an accelerated speed, travel at a decelerated speed, or travel at a turning; and an adjustment module, configured to adjust the first image based on the motion information of the vehicle that is obtained by the obtaining module, where the first image is an image displayed on a vehicle-mounted display of the vehicle.

Optionally, with reference to the foregoing second aspect, in a first possible implementation, the adjustment module is configured to perform zooming adjustment on the first image based on the motion information of the vehicle.

Optionally, with reference to the second aspect or the first possible implementation of the second aspect, in a second possible implementation, that the adjustment module is configured to adjust the first image based on the motion information of the vehicle further includes moving a boundary of the first image based on the motion information of the vehicle.

Optionally, with reference to the second aspect, the first possible implementation of the second aspect, or the second possible implementation of the second aspect, in a third possible implementation, the adjustment module is configured to zoom in the first image based on a first acceleration, where a zoom-in proportion of the first image is determined based on the first acceleration and first duration, the first acceleration is determined based on the displacement information of the acceleration pedal that is obtained by the obtaining module, and the first duration is duration from a time when the displacement information of the acceleration pedal is obtained to a time when the vehicle travels at a constant speed.

Optionally, with reference to the third possible implementation of the second aspect, in a fourth possible implementation, the zoom-in proportion of the first image is determined based on the first acceleration, the first duration, and a preset first compression function, and the first compression function is used to simulate a curve in which the first acceleration of the vehicle within a preset distance range changes with time.

Optionally, with reference to the second aspect, the first possible implementation of the second aspect, or the second possible implementation of the second aspect, in a fifth possible implementation, the adjustment module is configured to zoom out the first image based on a second acceleration, where a zoom-out proportion of the first image is determined based on the second acceleration and second duration, the second acceleration is determined based on the displacement information of the brake pedal that is obtained by the obtaining module, and the second duration is duration from a time when the displacement information of the brake pedal is obtained to a time when the vehicle travels at a constant speed.

Optionally, with reference to the fifth possible implementation of the second aspect, in a sixth possible implementation, the zoom-out proportion of the first image is determined based on the second acceleration, the second duration, and a preset second compression function, and the second compression function is used to simulate a curve in which the second acceleration of the vehicle within a preset distance range changes with time.

Optionally, with reference to the second aspect or the first to the sixth possible implementations of the second aspect, in a seventh possible implementation, the image display apparatus further includes a detection module. The detection module is configured to detect location information of the vehicle. The adjustment module is further configured to move down an upper boundary of the first image when the detection module detects that the vehicle travels to a first road section, where the first road section is an uphill road section on which the vehicle travels in front of the vehicle and that is predicted based on navigation information of the vehicle and a high-precision map, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

Optionally, with reference to the second aspect or the first to the sixth possible implementations of the second aspect, in an eighth possible implementation, the adjustment module is further configured to move down an upper boundary of the first image when it is detected that the vehicle travels to a first road section, where the first road section is an uphill road section on which the vehicle travels in front of the vehicle and that is predicted based on data obtained by an image sensor of the vehicle, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

Optionally, with reference to the second aspect or the first to the sixth possible implementations of the second aspect, in a ninth possible implementation, the image display apparatus further includes a detection module. The detection module is configured to detect location information of the vehicle. The adjustment module is further configured to move up a lower boundary of the first image when the detection module detects that the vehicle travels to a second road section, where the second road section is a downhill road section on which the vehicle travels in front of the vehicle and that is predicted based on navigation information of the vehicle and a high-precision map, a proportion of moving up the lower boundary of the first image is determined based on gravity acceleration and fourth duration, and the fourth duration is duration for the vehicle to travel through the second road section.

Optionally, with reference to the second aspect or the first to the sixth possible implementations of the second aspect, in a tenth possible implementation, the adjustment module is further configured to move up a lower boundary of the first image when it is detected that the vehicle travels to a second road section, where the second road section is a downhill road section on which the vehicle travels in front of the vehicle and that is predicted based on data obtained by an image sensor of the vehicle, a proportion of moving up the lower boundary of the first image is determined based on gravity acceleration and fourth duration, and the fourth duration is duration for the vehicle to travel through the second road section.

Optionally, with reference to the second aspect or the first to the tenth possible implementations of the second aspect, in an eleventh possible implementation, the obtaining module is further configured to obtain steering wheel angle information of the vehicle. The adjustment module is further configured to move a left boundary of the first image to the right when it is determined, based on the steering wheel angle information, that the vehicle turns left, where a proportion of moving the left boundary to the right is determined based on a second rate and fifth duration, the second rate is a rate of the vehicle when it is determined, based on the steering wheel angle information, that the vehicle turns left, and the fifth duration is duration, determined based on the steering wheel angle information, from a time when the vehicle turns left to a time when the vehicle stops turning left. The adjustment module is further configured to move a right boundary of the first image to the left when it is determined, based on the steering wheel angle information, that the vehicle turns right, where a proportion of moving the right boundary to the left is determined based on a third rate and sixth duration, the third rate is a rate of the vehicle when it is determined, based on the steering wheel angle information, that the vehicle turns right, and the sixth duration is duration, determined based on the steering wheel angle information, from a time when the vehicle turns right to a time when the vehicle stops turning left.

Optionally, with reference to the second aspect or the first to the tenth possible implementations of the second aspect, in a twelfth possible implementation, the adjustment module is further configured to move a left boundary of the first image to the right when it is detected that the vehicle travels to a third road section, where the third road section is a left-turn road section on which the vehicle travels in front of the vehicle and that is predicted based on data obtained by the image sensor of the vehicle, a proportion of moving the left boundary to the right is determined based on a second rate and fifth duration, the second rate is a rate of the vehicle when the vehicle travels to the third road section, and the fifth duration is duration for the vehicle to travel through the third road section; or move a right boundary of the first image to the left when the detection module detects that the vehicle travels to a fourth road section, where the fourth road section is a right-turn road section on which the vehicle travels in front of the vehicle and that is predicted based on data obtained by the image sensor of the vehicle, a proportion of moving the right boundary to the left is determined based on a third rate and sixth duration, the third rate is a rate of the vehicle when the vehicle travels to the fourth road section, and the sixth duration is duration for the vehicle to travel through the fourth road section.

Optionally, with reference to the second aspect, in a thirteenth possible implementation, the adjustment module is further configured to zoom in the first image based on a third acceleration when it is determined, according to a first ADAS instruction, that the vehicle travels at the accelerated speed, where a zoom-in proportion of the first image is determined based on the third acceleration and seventh duration, the third acceleration is determined according to the first ADAS instruction, the seventh duration is duration from a time when the vehicle travels at the accelerated speed that is determined according to the first ADAS instruction to a time when the vehicle travels at a constant speed, and the first ADAS instruction is used to instruct the vehicle to accelerate; zoom out the first image based on a fourth acceleration when it is determined, according to a second ADAS instruction, that the vehicle travels at the decelerated speed, where a zoom-out proportion of the first image is determined based on the fourth acceleration and eighth duration, the fourth acceleration is determined according to the second ADAS instruction, the eighth duration is duration from a time when the vehicle travels at the decelerated speed that is determined according to the second ADAS instruction to a time when the vehicle travels at the constant speed, and the second ADAS instruction is used to instruct the vehicle to decelerate; move a left boundary of the first image to the right when it is determined, according to a third ADAS instruction, that the vehicle turns left, where a proportion of moving the left boundary to the right is determined based on a second rate and fifth duration, the second rate is a rate of the vehicle when the vehicle turns left, and the fifth duration is duration in which the vehicle turns left; or move a right boundary of the first image to the left when it is determined, according to a fourth ADAS instruction, that the vehicle turns right, where a proportion of moving the right boundary to the left is determined based on a third rate and sixth duration, the third rate is a rate of the vehicle when the vehicle turns right, and the sixth duration is duration in which the vehicle turns right.

A third aspect of this application provides an image display system. The image display system includes a mobile terminal and a vehicle. The mobile terminal is configured to send a first instruction to the vehicle, where the first instruction is used to instruct the vehicle to send motion information of the vehicle. In response to the first instruction, the vehicle obtains the motion information of the vehicle, where the motion information includes at least one of first information, an upper-layer ADAS instruction, and a predicted motion track of the vehicle, the first information includes at least one of displacement information of the brake pedal, displacement information of the acceleration pedal, and steering wheel angle information, and the first ADAS instruction is used to instruct the vehicle to travel at an accelerated speed, travel at a decelerated speed, or travel at a turning. The vehicle is further configured to send the motion information of the vehicle to the mobile terminal. The mobile terminal is configured to adjust a first image based on the motion information of the vehicle, where the first image is an image displayed on a display of the mobile terminal.

Optionally, with reference to the third aspect, in a first possible implementation, the mobile terminal is configured to perform zooming adjustment on the first image based on the motion information of the vehicle.

Optionally, with reference to the third aspect or the first possible implementation of the third aspect, in a second possible implementation, the mobile terminal is further configured to move a boundary of the first image based on the motion information of the vehicle.

Optionally, with reference to the third aspect, the first possible implementation of the third aspect, or the second possible implementation of the third aspect, in a third possible implementation, the mobile terminal is configured to zoom in the first image based on a first acceleration, where a zoom-in proportion of the first image is determined based on the first acceleration and first duration, the first acceleration is determined based on the displacement information of the acceleration pedal, and the first duration is duration from a time when the vehicle obtains the displacement information of the acceleration pedal to a time when the vehicle travels at a constant speed.

Optionally, with reference to the third possible implementation of the third aspect, in a fourth possible implementation, the zoom-in proportion of the first image is determined based on the first acceleration, the first duration, and a preset first compression function, and the first compression function is used to simulate a curve in which the first acceleration of the vehicle within a preset distance range changes with time.

Optionally, with reference to the third aspect, the first possible implementation of the third aspect, or the second possible implementation of the third aspect, in a fifth possible implementation, the mobile terminal is configured to zoom out the first image based on a second acceleration, where a zoom-out proportion of the first image is determined based on the second acceleration and second duration, the second acceleration is determined based on the displacement information of the brake pedal, and the second duration is duration from a time when the vehicle obtains the displacement information of the brake pedal to a time when the vehicle travels at a constant speed.

Optionally, with reference to the fifth possible implementation of the third aspect, in a sixth possible implementation, the zoom-out proportion of the first image is determined based on the second acceleration, the second duration, and a preset second compression function, and the second compression function is used to simulate a curve in which the second acceleration of the vehicle within a preset distance range changes with time.

Optionally, with reference to the third aspect or the first to the sixth possible implementations of the third aspect, in a seventh possible implementation, the mobile terminal is further configured to move down an upper boundary of the first image when it is detected that the vehicle travels to a first road section, where the first road section is an uphill road section on which the vehicle travels in front of the vehicle and that is predicted based on navigation information of the vehicle that is determined by the mobile terminal and a high-precision map, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

Optionally, with reference to the third aspect or the first to the sixth possible implementations of the third aspect, in an eighth possible implementation, the mobile terminal is further configured to move down an upper boundary of the first image when it is detected that the vehicle travels to a first road section, where the first road section is an uphill road section on which the vehicle travels in front of the vehicle and that is predicted based on data obtained by an image sensor of the vehicle, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

Optionally, with reference to the third aspect or the first to the sixth possible implementations of the third aspect, in a ninth possible implementation, the mobile terminal is further configured to move up a lower boundary of the first image when it is detected that the vehicle travels to a second road section, where the second road section is a downhill road section on which the vehicle travels in front of the vehicle and that is predicted based on navigation information of the vehicle that is determined by the mobile terminal and a high-precision map, a proportion of moving up the lower boundary of the first image is determined based on gravity acceleration and fourth duration, and the fourth duration is duration for the vehicle to travel through the second road section.

Optionally, with reference to the second aspect or the first to the sixth possible implementations of the second aspect, in a tenth possible implementation, the mobile terminal is further configured to move up a lower boundary of the first image when it is detected that the vehicle travels to a second road section, where the second road section is a downhill road section on which the vehicle travels in front of the vehicle and that is predicted based on data obtained by an image sensor of the vehicle, a proportion of moving up the lower boundary of the first image is determined based on gravity acceleration and fourth duration, and the fourth duration is duration for the vehicle to travel through the second road section.

Optionally, with reference to the third aspect or the first to the tenth possible implementations of the third aspect, in an eleventh possible implementation, the mobile terminal is further configured to send a second instruction to the vehicle, where the second instruction is used to instruct the vehicle to send the steering wheel angle information of the vehicle. The mobile terminal is further configured to move a left boundary of the first image to the right when it is determined, based on the steering wheel angle information, that the vehicle turns left, where a proportion of moving the left boundary to the right is determined based on a second rate and fifth duration, the second rate is a rate of the vehicle when it is determined, based on the steering wheel angle information, that the vehicle turns left, and the fifth duration is duration, determined based on the steering wheel angle information, from a time when the vehicle turns left to a time when the vehicle stops turning left; or move a right boundary of the first image to the left when it is determined, based on the steering wheel angle information, that the vehicle turns right, where a proportion of moving the right boundary to the left is determined based on a third rate and sixth duration, the third rate is a rate of the vehicle when it is determined, based on the steering wheel angle information, that the vehicle turns right, and the sixth duration is duration, determined based on the steering wheel angle information, from a time when the vehicle turns right to a time when the vehicle stops turning left.

Optionally, with reference to the third aspect or the first to the tenth possible implementations of the third aspect, in a twelfth possible implementation, the mobile terminal is further configured to move a left boundary of the first image to the right when it is detected that the vehicle travels to a third road section, where the third road section is a left-turn road section on which the vehicle travels in front of the vehicle and that is predicted based on data obtained by the image sensor of the vehicle, a proportion of moving the left boundary to the right is determined based on a second rate and fifth duration, the second rate is a rate of the vehicle when the vehicle travels to the third road section, and the fifth duration is duration for the vehicle to travel through the third road section; or move a right boundary of the first image to the left when the detection module detects that the vehicle travels to a fourth road section, where the fourth road section is a right-turn road section on which the vehicle travels in front of the vehicle and that is predicted based on data obtained by the image sensor of the vehicle, a proportion of moving the right boundary to the left is determined based on a third rate and sixth duration, the third rate is a rate of the vehicle when the vehicle travels to the fourth road section, and the sixth duration is duration for the vehicle to travel through the fourth road section.

Optionally, with reference to the third aspect, in a thirteenth possible implementation, the mobile terminal is further configured to zoom in the first image based on a third acceleration when it is determined, according to a first ADAS instruction, that the vehicle travels at the accelerated speed, where a zoom-in proportion of the first image is determined based on the third acceleration and seventh duration, the third acceleration is determined according to the first ADAS instruction, the seventh duration is duration from a time when the vehicle travels at the accelerated speed that is determined according to the first ADAS instruction to a time when the vehicle travels at a constant speed, and the first ADAS instruction is used to instruct the vehicle to accelerate; zoom out the first image based on a fourth acceleration when it is determined, according to a second ADAS instruction, that the vehicle travels at the decelerated speed, where a zoom-out proportion of the first image is determined based on the fourth acceleration and eighth duration, the fourth acceleration is determined according to the second ADAS instruction, the eighth duration is duration from a time when the vehicle travels at the decelerated speed that is determined according to the second ADAS instruction to a time when the vehicle travels at the constant speed, and the second ADAS instruction is used to instruct the vehicle to decelerate; move a left boundary of the first image to the right when it is determined, according to a third ADAS instruction, that the vehicle turns left, where a proportion of moving the left boundary to the right is determined based on a second rate and fifth duration, the second rate is a rate of the vehicle when the vehicle turns left, and the fifth duration is duration in which the vehicle turns left; or move a right boundary of the first image to the left when it is determined, according to a fourth ADAS instruction, that the vehicle turns right, where a proportion of moving the right boundary to the left is determined based on a third rate and sixth duration, the third rate is a rate of the vehicle when the vehicle turns right, and the sixth duration is duration in which the vehicle turns right.

A fourth aspect of this application provides a vehicle, where the vehicle may include a processor, the processor is coupled to a memory, the memory stores program instructions, and when the program instructions stored in the memory are executed by the processor, the method described in any one of the first aspect or the possible implementations of the first aspect is implemented.

A fifth aspect of this application provides a vehicle, where the vehicle may include a processor and a communications interface. The processor obtains program instructions by using the communications interface, and when the program instructions are executed by the processor, the method described in any one of the first aspect or the possible implementations of the first aspect is implemented.

A sixth aspect of this application provides a computer-readable storage medium, where the computer-readable storage medium may include a program, and when the program is run on a computer, the computer is enabled to perform the method described in any one of the first aspect or the possible implementations of the first aspect.

A seventh aspect of this application provides an intelligent automobile, where the intelligent automobile includes a processing circuit and a storage circuit, and the processing circuit and the storage circuit are configured to perform the method described in any one of the first aspect or the possible implementations of the first aspect.

An eighth aspect of this application provides a chip system, where the chip system may include a processor, configured to support a vehicle in implementing functions in the method described in any one of the first aspect or the possible implementations of the first aspect.

A ninth aspect of this application provides an image display apparatus, where the image display apparatus includes a processor, where the processor is coupled to a memory, the memory stores program instructions, and when the program instructions stored in the memory are executed by the processor, the method described in any one of the first aspect or the possible implementations of the first aspect is implemented.

A tenth aspect of this application provides a computer program product. When the computer program product is run on a device, the device is enabled to perform the method described in any one of the first aspect or the possible implementations of the first aspect. The device includes but is not limited to an image display apparatus, an entire computing device, an automobile, a vehicle-mounted display in an automobile, or a mobile device.

DESCRIPTION OF EMBODIMENTS

The following describes embodiments of this application with reference to the accompanying drawings. It is clear that the described embodiments are merely some rather than all of the embodiments of this application. A person of ordinary skill in the art may learn that, with development of technologies and emergence of new scenarios, the technical solutions provided in the embodiments of this application are also applicable to similar technical problems.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances so that embodiments of the present application described herein can be implemented in other orders than the order illustrated or described herein. Moreover, the terms "including", "having", and any other variants thereof are intended to cover a non-exclusive inclusion, for example, a process, method, system, product, or device that includes a series of steps or modules is not necessarily limited to those steps or modules that are clearly listed, but may include other steps or modules that are not clearly listed or that are inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into the modules in this application is logical division. In actual application, there may be another division manner. For example, a plurality of modules may be combined or integrated into another system, or some features may be ignored or not performed. In addition, the displayed or discussed mutual coupling or direct coupling or communication connection may be through some ports, and the indirect coupling or communication connection between modules may be in an electrical form or another similar form. This is not limited in this application. In addition, modules or sub-modules described as separate components may be or may not be physically separated, or may be or may not be physical modules, or may not be grouped into a plurality of circuit modules. Objectives of the solutions of this application may be achieved by selecting some or all of the modules according to actual requirements.

A vehicle described in this application may be an internal combustion engine vehicle that uses an engine as a power source, a hybrid vehicle that uses an engine and an electric motor as a power source, an electric vehicle that uses an electric motor as a power source, or the like.

Figure 1A:
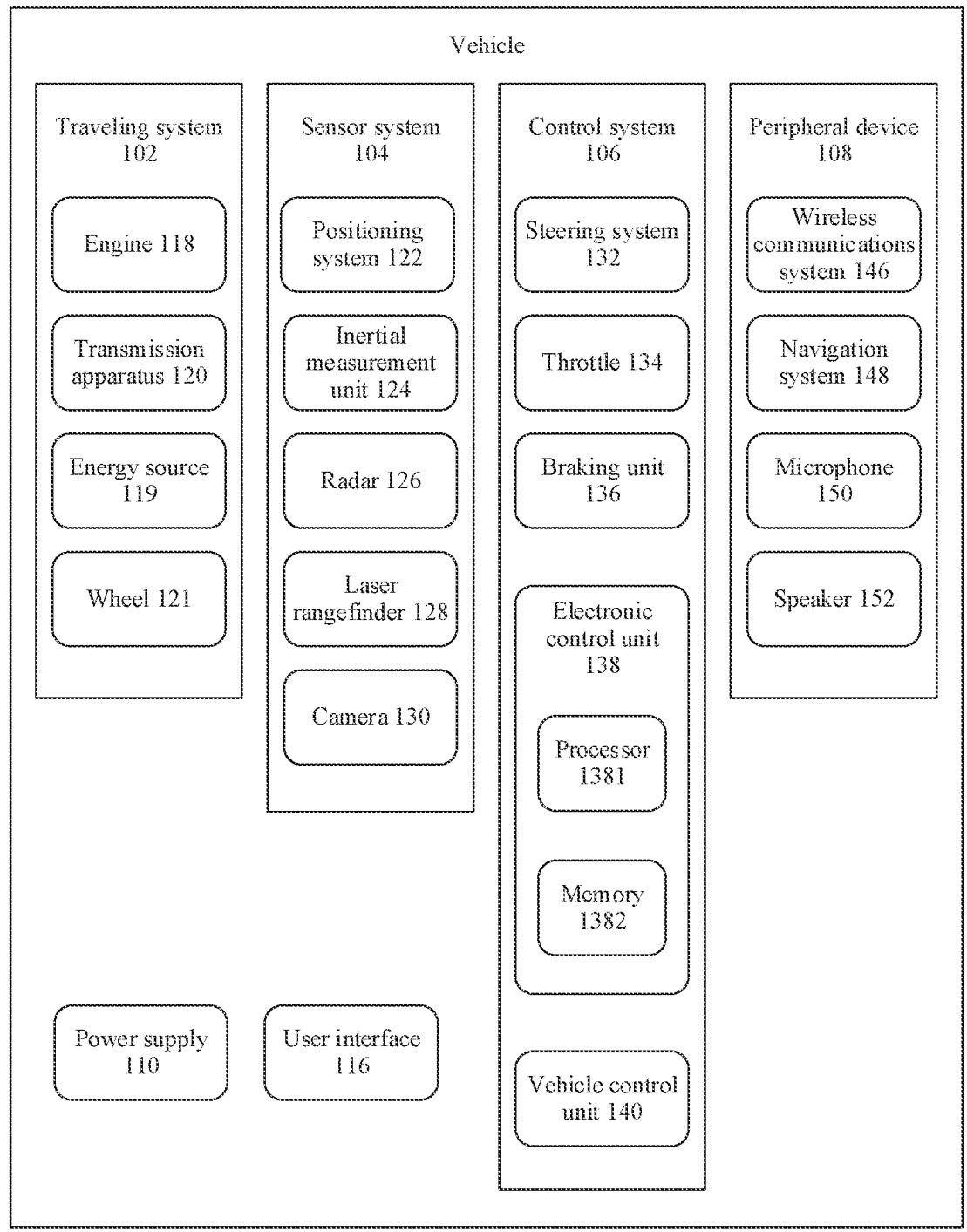
FIG. 1A is a schematic diagram of a structure of a vehicle according to an embodiment of this application.

To facilitate understanding of this solution, in an embodiment of this application, a structure of a vehicle is first described with reference to FIG. 1A. FIG. 1A is a schematic diagram of a structure of a vehicle according to an embodiment of this application.

The vehicle may include various subsystems, such as a traveling system 102, a sensor system 104, a control system 106, one or more peripheral devices 108, a power supply 110, and a user interface 116. Optionally, the vehicle may include more or fewer subsystems, and each subsystem may include a plurality of components. In addition, each subsystem and component of the vehicle may be interconnected in a wired or wireless manner (for example, Bluetooth).

The traveling system 102 may include a component that provides power motion for the vehicle. In an embodiment, the traveling system 102 may include an engine 118, an energy source 119, a transmission apparatus 120, and a wheel 121.

The engine 118 may be an internal combustion engine, an electric motor, an air compression engine, or another type of engine combination, for example, a hybrid engine including a gasoline engine and an electric motor, or a hybrid engine including an internal combustion engine and an air compression engine. The engine 118 converts the energy source 119 into mechanical energy. Examples of energy source 119 include gasoline, diesel, other petroleum-based fuels, propane, other compressed gas-based fuels, ethanol, solar panels, batteries, and other sources of electricity. The energy source 119 may also provide energy for another system of the vehicle. The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to the wheel 121.

The sensor system 104 may include several sensors that sense vehicle location information. For example, the sensor system 104 may include a positioning system 122 (the positioning system may be a global positioning system (GPS), a BEIDOU system, or another positioning system), an inertial measurement unit (IMU) 124, a radar 126, a laser rangefinder 128, and a camera 130. The sensor system 104 may further include sensors (for example, an in-vehicle air quality monitor, a fuel gauge, an oil thermometer, and the like) of an internal system of the monitored vehicle. Sensing data from one or more of these sensors may be used to detect an object and corresponding characteristics (for example, a location, a shape, a direction, a rate, and the like) of the object. This detection and recognition are key functions of safe operations of autonomous vehicles.

The positioning system 122 may be configured to estimate a geographical location of the vehicle, for example, longitude and latitude information of a location of the vehicle. The IMU 124 is configured to sense a change in location and orientation of the vehicle based on an inertial acceleration rate. In an embodiment, the IMU 124 may be a combination of an accelerometer and a gyroscope. The radar 126 may sense an object in an ambient environment of the vehicle by using a radio signal, and may be represented as a millimeter-wave radar or a laser radar. In some embodiments, in addition to sensing the object, the radar 126 may be further configured to sense a rate and/or a forward direction of the object. The laser rangefinder 128 may use a laser to sense an object in an environment in which the vehicle is located. In some embodiments, the laser rangefinder 128 may include one or more laser sources, a laser scanner, one or more detectors, and other system components. The camera 130 may be configured to capture a plurality of images of an ambient environment of the vehicle. The camera 130 may be a static camera or a video camera.

The control system 106 controls operations of the vehicle and components of the vehicle. The control system 106 may include various components, including a steering system 132, a throttle 134, a braking unit 136, an electronic control unit (ECU) 138, and a vehicle control unit (VCU) 140.

The steering system 132 may be operated to adjust a forward direction of the vehicle. For example, in an embodiment, the steering system 132 may be a steering wheel system. The throttle 134 is configured to control an operation rate of the engine 118 and further control a rate of the vehicle. The braking unit 136 is configured to control the vehicle to decelerate. The braking unit 136 may use friction to slow down the wheel 121. In another embodiment, the braking unit 136 may convert kinetic energy of the wheel 121 into a current. The braking unit 136 may also take other forms to slow down a rotational speed of the wheel 121, so as to control the rate of the vehicle. The electronic control unit 138 of the vehicle may be implemented as a single ECU or a plurality of ECUs on the vehicle. The single ECU or the plurality of ECUs is/are configured to communicate with the peripheral device 108 and the sensor system 104. The ECU 138 of the vehicle may include at least one processor 1381 and a memory 1382 (read-only memory, ROM). The at least one processor may be implemented or executed by using one or more general-purpose processors, a content addressable memory, a digital signal processor, an application-specific integrated circuit, a field programmable gate array, any suitable programmable logic device, a discrete gate or transistor logic, a discrete hardware component, or any combination designed to perform the functions described herein. In particular, the at least one processor may be implemented as one or more microprocessors, controllers, microcontroller units (MCUs), or state machines. In addition, the at least one processor may be implemented as a combination of computing devices, such as a digital signal processor or microprocessor, a plurality of microprocessors, one or more microprocessors combined with a digital signal processor core, or any other combination of such configurations. The ROM may provide data storage, including storage of an address, a route, and a driving direction in this application.

The VCU 140 may provide information such as an engine status, a rate, a gear, and a steering wheel angle of the vehicle for the ECU 138.

The vehicle interacts with an external sensor, another vehicle, another computer system, or a user by using the peripheral device 108. The peripheral device 108 may include a wireless communications system 146, a navigation system 148, a microphone 150, and/or a speaker 152. In some embodiments, the peripheral device 108 provides a means for a user of a vehicle to interact with the user interface 116. For example, the navigation system 148 may be implemented as a part of an in-vehicle entertainment system, an in-vehicle display system, an in-vehicle instrument cluster, or the like. In a practical embodiment, the navigation system 148 is implemented to include or cooperate with the sensor system 104. The sensor system 104 derives a current geographical location of the vehicle in real time or substantially in real time. The navigation system 148 is configured to provide navigation data for a driver of the vehicle. The navigation data may include location data of the vehicle, suggested route planned traveling indications, and visible map information for a vehicle operator. The navigation system 148 may present the location data to the driver of the vehicle through a display element or another presenting device. The current location of the vehicle may be described by using one or more of the following information such as a triangulation location, a latitude/longitude location, x and y coordinates, or any other symbol or any measurement that indicates the geographical location of the vehicle.

The user interface 116 may further operate the navigation system 148 to receive user input. The navigation system 148 may be operated through a touchscreen. The navigation system 148 provides a route planning capability and a navigation capability when the user enters geographical location values of start and end points. In other cases, the peripheral device 108 may provide a means for the vehicle to communicate with another device located in the vehicle. For example, the microphone 150 may receive audio (for example, a voice command or other audio input) from the user of the vehicle. Similarly, the speaker 152 may output audio to the user of the vehicle. The wireless communications system 146 may wirelessly communicate with one or more devices directly or through a communications network. For example, the wireless communications system 146 may use 3G cellular communication such as code division multiple access (CDMA), Evolution-Data Optimized (EVDO), or Global System for Mobile Communications (GSM)/general packet radio service (GPRS), or fourth generation (4G) cellular communication such as long term evolution (LTE), or 5G cellular communication. The wireless communications system 146 may communicate with a wireless local area network (WLAN) by using WIFI. In some embodiments, the wireless communications system 146 may directly communicate with a device by using an infrared link, BLUETOOTH, or ZIGBEE. Other wireless protocols, for example, various vehicle communications systems such as the wireless communications system 146, may include one or more dedicated short range communications (DSRC) devices, which may include public and/or private data communication between vehicles and/or roadside stations.

The power supply 110 may supply power to various components of the vehicle. In an embodiment, the power supply 110 may be a rechargeable lithium-ion or lead-acid battery. One or more battery packs of such a battery may be configured as the power supply to supply power to the components of the vehicle. In some embodiments, the power supply 110 and the energy source 119 may be implemented together, for example, in some pure electric vehicles.

Optionally, one or more of the foregoing components may be installed separately from or associated with the vehicle. For example, the memory 1382 may exist partially or entirely separate from the vehicle. The foregoing components may be communicatively coupled together in a wired and/or wireless manner.

Optionally, the foregoing components are merely examples. In actual application, components in the foregoing modules may be added or deleted based on an actual requirement. FIG. 1A should not be understood as a limitation on this embodiment of this application.

The vehicle may be a car, a truck, a motorcycle, a bus, a boat, a lawn mower, a recreational vehicle, a playground vehicle, a construction device, a trolley, a golf cart, a handcart, or the like. This is not limited in this embodiment of this application.

The foregoing describes an architectural diagram of a system to which the embodiments of this application are applicable with reference to FIG. 1A. To better understand the technical solutions provided in the embodiments of this application, the following describes a research approach of the technical solutions described in this application.

Figure 1B:
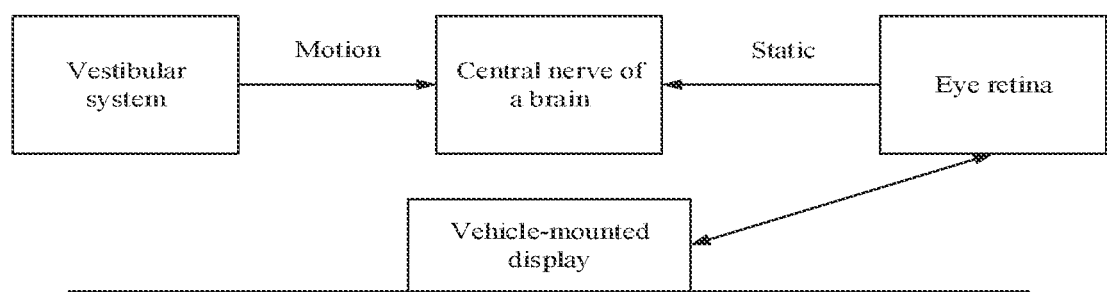
FIG. 1B is a schematic diagram of a principle that carsickness is caused when a passenger watches a video in a vehicle.

First, with reference to FIG. 1B, a principle that carsickness is caused when a passenger watches a video in a vehicle is described. FIG. 1B is a schematic diagram of a principle that carsickness occurs when a passenger watches a video by taking an automobile. In an actual driving process of a vehicle, there is a motion such as acceleration, deceleration, or turning. Therefore, a signal transmitted by a vestibular system to a central nerve of a brain is a motion signal. The passenger cannot predict a state of the vehicle as a driver. A screen of a vehicle-mounted display seen by the passenger is static. Therefore, a signal transmitted by the eyes to the central nerve of the brain is static. Because the vestibular system and the eyes transmit the different signals to the central nerve of the brain, this affects cognitive balance of the brain. Therefore, when passengers watch videos on vehicles, carsickness occurs.

To solve the problem that the passengers may get carsick when watching the videos on the vehicles, one solution is to use a vehicle-mounted gyroscope to feed back related motion information obtained by the vehicle-mounted gyroscope to the passenger screen, so that the passengers can feel the motion information. However, the applicant finds that in the foregoing process, transmission processing of a plurality of devices is involved from a time when the related motion information is obtained by the vehicle-mounted gyroscope to a time when an image is presented to the passenger, and a delay exists when the image is presented to the passenger. This is unfavorable for the passenger to alleviate the carsickness symptom. Therefore, to resolve the delay, in the solution provided in this application, operation information of the driver is collected, and a high-precision map is added to accurately predict information such as upcoming acceleration and deceleration of the vehicle, and feedback the information to the display in advance. This relieves fatigue of the user and prevents carsickness. Alternatively, in the solution provided in this application, information such as upcoming acceleration and deceleration of the vehicle may be predicted by using an upper-layer ADAS instruction, and fed back to the display in advance. This relieves fatigue of the user and prevents carsickness. Based on the foregoing research idea, the following describes the technical solutions provided in this application.

Figure 2:
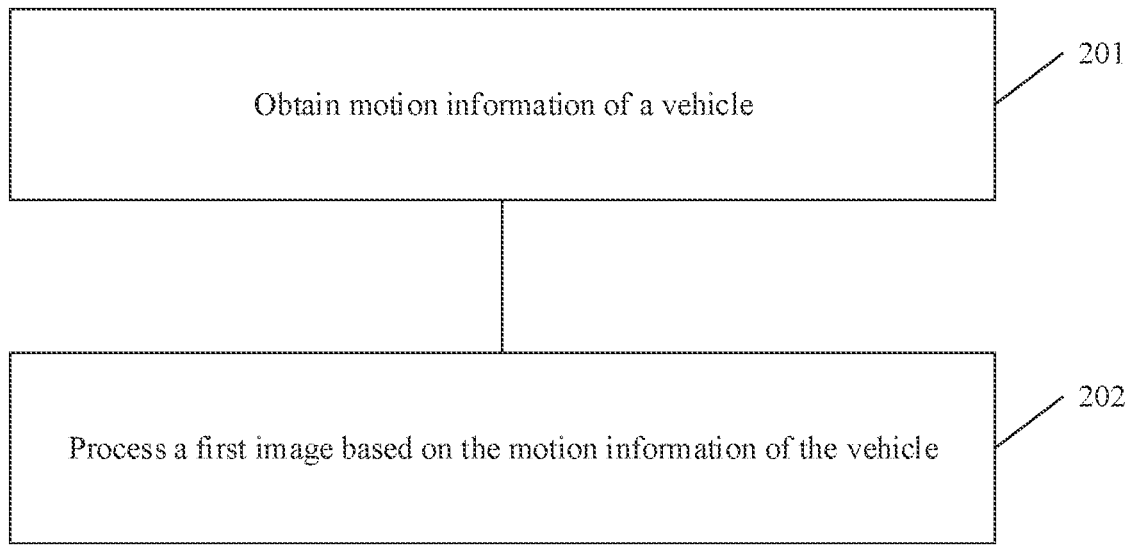
FIG. 2 is a schematic flowchart of an image display method according to an embodiment of this application.

FIG. 2 is a schematic flowchart of an image display method according to an embodiment of this application.

An image display method provided in an embodiment of this application may include the following steps.

201: Obtain motion information of a vehicle.

The motion information includes first information, an upper-layer ADAS instruction, or a predicted motion track of the vehicle, and the first information includes one or two of displacement information of a brake pedal and displacement information of an acceleration pedal. For example, the motion information may include the displacement information of the brake pedal, or the motion information may include the displacement information of the acceleration pedal, or the motion information may include the displacement information of the brake pedal and the displacement information of the acceleration pedal, or the motion information may include the ADAS instruction, or the motion information may include the displacement information of the brake pedal and the ADAS instruction, or the motion information may include the displacement information of the acceleration pedal and the ADAS instruction, or the motion information may include the displacement information of the brake pedal, the displacement information of the acceleration pedal, and the ADAS instruction. The ADAS instruction may be used to instruct the vehicle to travel at an accelerated speed, or the ADAS instruction may be used to instruct the vehicle to travel at a decelerated speed, or the ADAS instruction may be used to instruct the vehicle to travel at a turning. It should be noted that the ADAS instruction may simultaneously instruct the vehicle to travel at the accelerated speed and travel at the turning, or simultaneously instruct the vehicle to travel at the decelerated speed and travel at the turning. In a possible implementation, the motion track of the vehicle may be predicted by using data obtained by an image sensor. In a possible implementation, the motion track of the vehicle may be predicted by using navigation information and a high-precision map. The predicted motion track of the vehicle may be that the vehicle is about to travel uphill, or that the vehicle is about to travel downhill, or that the vehicle is about to travel at a turning. The following describes how to predict the motion track of the vehicle based on the data obtained by the image sensor, and how to predict the motion track of the vehicle based on the navigation information and the high-precision map.

For example, for a non-autonomous vehicle, the motion information may include the first information. For an autonomous vehicle, the motion information may include the first information or the upper-layer ADAS instruction. For example, when the vehicle is in a manual driving mode, the motion information may include the first information. When the vehicle is in an autonomous mode, the motion information may include the ADAS instruction. The manual driving mode mentioned in this application below is used to indicate a scenario in which a driver controls a vehicle, including a non-autonomous vehicle. Details are not described below again.

In a possible implementation, the displacement information of the brake pedal may be obtained by using a displacement sensor mounted on the brake pedal. In a possible implementation, the displacement information of the acceleration pedal may be obtained by using a displacement sensor mounted on the acceleration pedal. The acceleration pedal is sometimes referred to as a throttle, and a name of the component is not limited in this embodiment of this application.

202: Process a first image based on the motion information of the vehicle.

Processing the first image includes but is not limited to zooming in the first image, zooming out the first image, and moving a boundary of the first image. It should be noted that, in addition to performing zoom-in processing on the first image, performing zoom-out processing on the first image, and moving the boundary of the first image mentioned in this application, other processing may be performed on the first image. This is not limited in this embodiment of this application. For example, brightness adjustment and resolution adjustment may be further performed on the first image based on the motion information of the vehicle. To better understand the solutions provided in this application, the following uses an example to describe that brightness adjustment and resolution adjustment may be further performed on the first image based on the motion information of the vehicle.

In a possible application scenario, when it is predicted, based on the motion information of the vehicle, that the vehicle is about to travel to a tunnel, the first image is brightened when the vehicle travels to the tunnel or when the vehicle is about to travel to the tunnel. It may be determined, based on the data obtained by the image sensor of the vehicle, that the vehicle is about to travel to the tunnel, or it may be determined, based on the navigation information of the vehicle and the high-precision map, that the vehicle is about to travel to the tunnel. An image including the tunnel may be used as training data to train a model, so that the trained model can identify the tunnel. When the vehicle travels, the data obtained by using the image sensor may be used as input data of the model, and whether a road section on which the vehicle travels in front of the vehicle is a tunnel may be determined based on output data of the model. It should be noted that a type of the model is not limited in this embodiment of this application. For example, the model may be any model used for image recognition or image detection. It should be noted that, in a possible implementation, only brightness of a middle area of the first image may be improved. This is because a target object or an object of an image concerned by a passenger is usually located in the center of the first image. In an actual application scenario, it may also be set according to a requirement that brightness of any area in the first image is adjusted based on the motion information. In addition, it should be noted that brightening the first image in the tunnel scenario mentioned above is merely a scenario that may be covered in this application. In another scenario, it may be set according to a requirement that brightness of the first image is darkened, or brightness of a part of an area of the first image is darkened.

In a possible application scenario, when the vehicle travels to the tunnel, resolution of the first image may be further improved. Because the target object or the object of the image concerned by the passenger is usually located in the center of the first image, in a possible implementation, only resolution of the central area of the first image may be improved. It should be noted that, in an actual application scenario, it may also be set according to a requirement that the resolution of any area in the first image is adjusted based on the motion information.

In a possible application scenario, when it is predicted, based on the motion information of the vehicle, that the front is a bumpy road section, for example, it may be determined, based on the data obtained by the image sensor of the vehicle, that the front of the vehicle is the bumpy road section, or it may be determined, based on the navigation information of the vehicle and the high-precision map, that the front of the vehicle is about to travel to the bumpy road section. When the vehicle travels to the bumpy road section or is about to travel to the bumpy road section, resolution of the first image is improved. In different scenarios, the brightness and the resolution of the first image are adjusted based on the motion information of the vehicle, so that visual fatigue of the passenger can also be alleviated. For example, in the tunnel scenario, the resolution of the first image is brightened and the brightness of the first image is brightened, so that passengers can see the first image more easily, viewing experience of the passengers is improved, and visual fatigue is alleviated.

The first image is an image displayed on the vehicle-mounted display of the vehicle.

According to the solution provided in this application, the size of the first image may be adjusted based on the motion information of the vehicle, so that the image moves dynamically relative to eyes. Therefore, signals transmitted by a vestibular system to a central nerve of a brain are motion signals, and images of the vehicle-mounted display that are seen by passengers are also motion signals. Therefore, signals transmitted by passenger's eyes to the central nerve of the brain are also motion signals. Therefore, there is no great difference between the signals transmitted by the vestibular system and the signals transmitted by the eyes to the central nerve of the brain. This does not affect cognitive balance of the brain and alleviates a problem that the passengers may get carsick when watching videos on the vehicle.

In the solution provided in this application, the first image may be adjusted for a vehicle in a plurality of moving scenarios, to achieve a better effect of relieving carsickness. The plurality of motion scenarios may include a scenario in which the vehicle is in an accelerated motion, a scenario in which the vehicle is in a deceleration motion, a scenario in which the vehicle is in an uphill, a scenario in which the vehicle is in a downhill, and a scenario in which the vehicle is in a turning. For these motion scenarios, the following describes how to zoom in or zoom out the first image based on the motion information of the vehicle.

1. Acceleration Scenario

Figure 3:
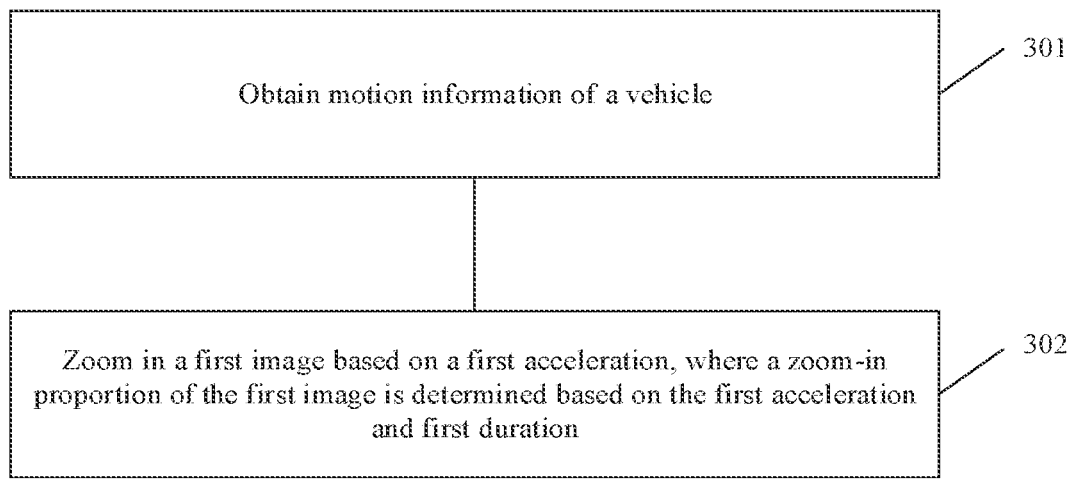
FIG. 3 is another schematic flowchart of an image display method according to an embodiment of this application.

FIG. 3 is a schematic flowchart of an image display method according to an embodiment of this application.

As shown in FIG. 3, an image display method provided in an embodiment of this application may include the following steps.

301: Obtain motion information of a vehicle.

Step 301 may be understood with reference to step 201 in the embodiment corresponding to FIG. 2. Details are not described herein again.

302: Zoom in a first image based on a first acceleration, where a zoom-in proportion of the first image is determined based on the first acceleration and first duration.

In a possible implementation, for a manual driving mode, the first acceleration is determined based on displacement information of an acceleration pedal, and the first duration is duration from a time when the displacement information of the acceleration pedal is obtained to a time when the vehicle travels at a constant speed.

In a possible implementation, for an autonomous mode, the first acceleration is determined based on ADAS instruction information, the ADAS instruction instructs the vehicle to travel at an accelerated speed, and the first duration is duration from a time when the vehicle travel at the accelerated speed according to the ADAS instruction to a time when the vehicle travels at a constant speed.

In this application, the acceleration of the vehicle is obtained by using the displacement information of the acceleration pedal. Different from that there is a lag in directly collecting the acceleration of the vehicle, obtaining the acceleration of the vehicle by using the displacement information of the acceleration pedal can well resolve a delay problem. In a possible implementation, the first acceleration is determined based on a difference between the displacement of the acceleration pedal and a first preset distance. The first preset distance is set to more accurately determine the first acceleration. For example, a foot of a driver is placed on the acceleration pedal, but the driver does not step on the acceleration pedal. In other words, the driver does not intend to step on the acceleration pedal, and the acceleration pedal may generate short-distance displacement only due to foot jitter or another reason. When the acceleration in the vehicle is obtained based on the displacement information of the acceleration pedal, the short-distance displacement may be subtracted from total displacement of the acceleration pedal, and the first acceleration is determined based on information about pedal displacement obtained after the first preset distance is removed.

In a possible implementation, when an electronic throttle is used, the electronic throttle may convert displacement at which the driver steps on the acceleration pedal into a voltage signal in direct proportion to the displacement of the acceleration pedal. The first acceleration may be determined by using a variation of a voltage signal before and after the driver steps on the acceleration pedal.

Because the displacement of the acceleration pedal directly controls a throttle, that is, a traction force of the vehicle, a relationship between the traction force of the vehicle and the displacement of the acceleration pedal may be represented by using the following formula 1-1:

$$F_1 = k_1 * d_1 \qquad (1\text{-}1)$$

$F_1$ represents the traction force of the vehicle, $d_1$ represents the displacement of the acceleration pedal, $k_1$ represents a coefficient, and a value of $k_1$ is related to a factory configuration of the vehicle. Different types and different brands of vehicles may correspond to different values of $k_1$. In a possible implementation, magnitudes of traction forces corresponding to displacement of different acceleration pedals may also be counted, to determine a value of $k_1$.

In this case, the first acceleration may be represented by using the following formula 1-2:

$$a_1 = k_1 * d/m \qquad (1\text{-}2)$$

m represents quality of the vehicle.

The first image may be zoomed in by using the first acceleration $a_1$, or the first image moves in a direction close to the passenger by using the first acceleration $a_1$. Duration in which the first image is zoomed in is duration from a time when the vehicle travels at an accelerated speed to a time when the vehicle travels at a constant speed. In a possible implementation, the first duration may be obtained from a vehicle control unit (VCU). A zoom-in proportion of the first image is determined based on the first acceleration and the first duration.

Figure 4:
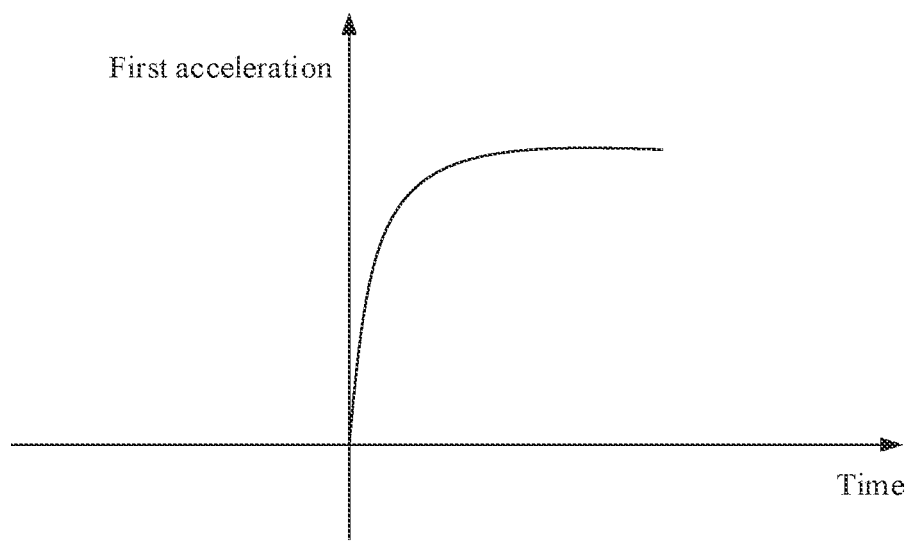
FIG. 4 is a schematic curve of a compression function.

In a possible implementation, it is considered that an actual zoom-in proportion of the image should be within a very small range. Therefore, the zoom-in proportion of the first image may be determined based on the first acceleration, the first duration, and a first compression function. The first compression function is used to simulate a curve in which the first acceleration of the vehicle within the first preset distance range changes with time. In the following, tanh ( ) is used to represent the compression function. It should be noted that a type of the compression function is not limited in this embodiment of this application. For example, as shown in FIG. 4, FIG. 4 is a schematic curve of a compression function. A zoom-in proportion of the first image may be represented by using the following formulas 1-3:

$$B1 = k_1'^* \tan h(a_1 * t_1^2) \tag{1-3}$$

$B_1$ indicates the zoom-in proportion of the first image. $k_1'$ represents an adjustment coefficient, and the curve in which the first acceleration of the vehicle within the first preset distance range changes with time may be better simulated by debugging $k_1'$. $t_1$ represents second duration.

Figure 5:
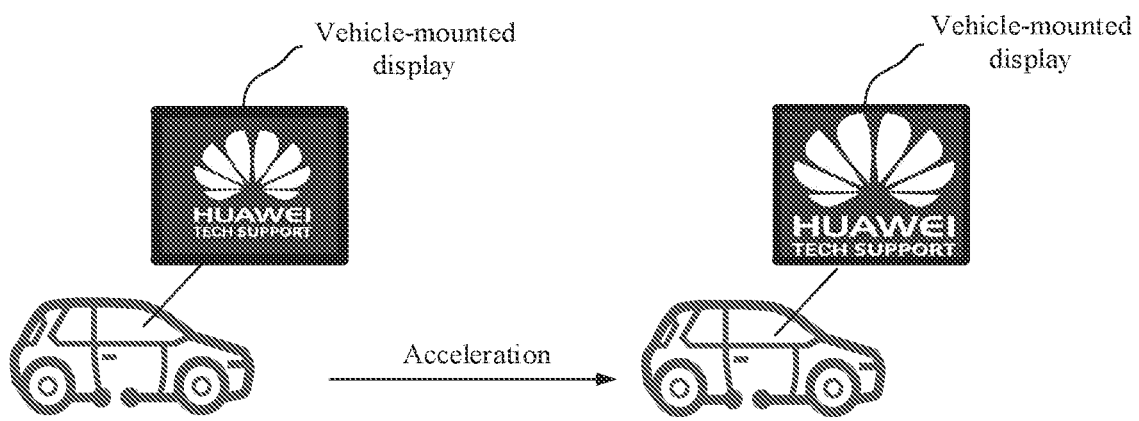
FIG. 5 is a schematic diagram of an application scenario of an image display method according to an embodiment of this application.

To better understand how to display an image in the acceleration scenario in the solutions provided in this application, the following describes the acceleration scenario with reference to a specific application scenario. FIG. 5 is a schematic diagram of an application scenario of an image display method according to an embodiment of this application. As shown in FIG. 5, when a vehicle travels on a road, if it is determined, based on motion information of the vehicle, that the vehicle is traveling at an accelerated speed, a first image displayed on a vehicle-mounted display on the vehicle is zoomed in. For a zoom-in proportion, a zoom-in speed, and a zoom-in time, refer to step 302. Details are not described herein again. It should be noted that, in FIG. 5, to better reflect an image zoom-in process in this solution, a same image is selected for zooming in and displaying. In an actual scenario, the vehicle-mounted display may play a video, that is, a continuous image. In an acceleration process, zoom-in processing is performed on the image that is being played by the vehicle-mounted display. The following involves image processing, for example, zooming out the image, moving down the upper boundary of the image, moving the left boundary to the right, or moving the right boundary to the left, where the image is understood as this image. That is, the image being played by the vehicle-mounted display is processed. Details are not described below again.

2. Deceleration Scenario

Figure 6:
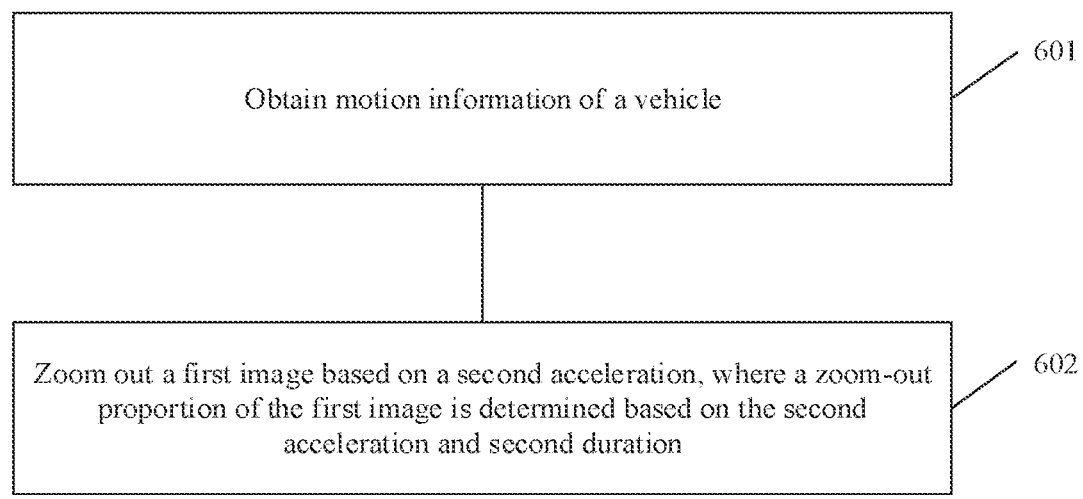
FIG. 6 is another schematic flowchart of an image display method according to an embodiment of this application.

FIG. 6 is a schematic flowchart of an image display method according to an embodiment of this application.

As shown in FIG. 6, an image display method provided in an embodiment of this application may include the following steps.

601: Obtain motion information of a vehicle.

Step 601 may be understood with reference to step 201 in the embodiment corresponding to FIG. 2. Details are not described herein again.

602: Zoom out a first image based on a second acceleration, where a zoom-out proportion of the first image is determined based on the second acceleration and second duration.

In a possible implementation, for a manual driving mode, the second acceleration is determined based on displacement information of a brake pedal, and the second duration is duration from a time when the displacement information of the brake pedal is obtained to a time when the vehicle travels at a constant speed.

In a possible implementation, for an autonomous mode, the second acceleration is determined based on ADAS instruction information, the ADAS instruction instructs the vehicle to travel at a decelerated speed, and the second duration is duration from a time when the vehicle travel at the decelerated speed according to the ADAS instruction to a time when the vehicle travels at a constant speed.

In this application, the acceleration of the vehicle is obtained by using the displacement information of the brake pedal. Different from that there is a lag in directly collecting the acceleration of the vehicle, obtaining the acceleration of the vehicle by using the displacement information of the brake pedal can well resolve a delay problem. In a possible implementation, the second acceleration is determined based on a difference between the displacement of the brake pedal and a second preset distance. The second preset distance is set to more accurately determine the second acceleration. For example, a foot of a driver is placed on the brake pedal, but the driver does not step on the brake pedal, that is, the driver does not intend to step on the brake pedal, and the brake pedal may generate short-distance displacement only due to foot jitter or another reason. When the acceleration in the vehicle is obtained based on the displacement information of the brake pedal, the short-distance displacement may be subtracted from total displacement of the brake pedal, and the second acceleration is determined based on information about the pedal displacement obtained after the second preset distance is removed.

Because the displacement of the brake pedal directly controls a magnitude of braking power, a relationship between the braking power of the vehicle and the displacement of the brake pedal may be represented by using the following formula 2-1:

$$F_2 = k_2 * d_2 \tag{2-1}$$

$F_2$ represents the braking power of the vehicle, $d_2$ represents the displacement of the brake pedal, $k_2$ represents a coefficient, and a value of $k_2$ is related to a factory configuration of the vehicle. Different types and different brands of vehicles may correspond to different values of $k_2$. In a possible implementation, values of braking forces corresponding to displacement of different brake pedals may also be counted, to determine a value of $k_2$.

The second acceleration may be represented by using the following formula 2-2:

$$a_2 = k_2 * d_2 / m \tag{2-2}$$

m represents quality of the vehicle.

The first image may be zoomed out by using the second acceleration $a_2$, or the first image moves in a direction away from the passenger by using the second acceleration $a_2$. A second duration for which the first image is zoomed out is duration from a time when the vehicle travel at a decelerated speed to a time when the vehicle travels at a constant speed. In a possible implementation, the first duration may be obtained from a vehicle control unit (VCU). A zoom-out proportion of the first image is determined based on the second acceleration and the second duration.

Figure 7:
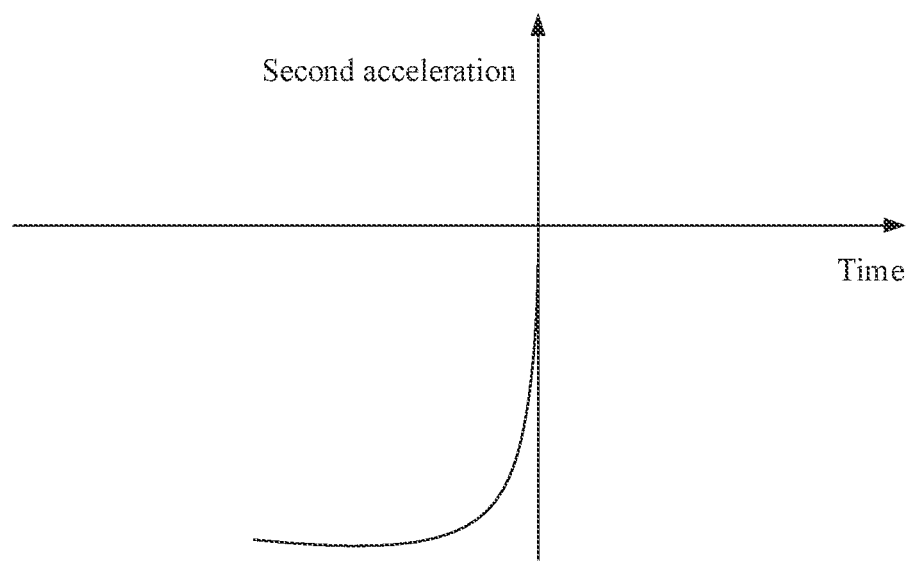
FIG. 7 is a schematic curve of another compression function.

In a possible implementation, it is considered that an actual zoom-out proportion of the image should be within a very small range, the zoom-out proportion of the first image may be determined based on the second acceleration, the second duration, and a second compression function. The second compression function is used to simulate a curve in which the second acceleration of the vehicle within the second preset distance range changes with time. For example, FIG. 7 is a schematic curve of a second compression function. The zoom-out proportion of the first image may be represented by using the following formulas 2-3:

$$S1=(k_2'*\tan h(a*t_2^2)) \quad (2\text{-}3)$$

S1 represents the zoom-out proportion of the first image. $k_2'$ represents an adjustment coefficient, and the curve in which the second acceleration of the vehicle within the second preset distance range changes with time may be better simulated by debugging $k_2'$. $t_2$ represents the second duration.

Figure 8:
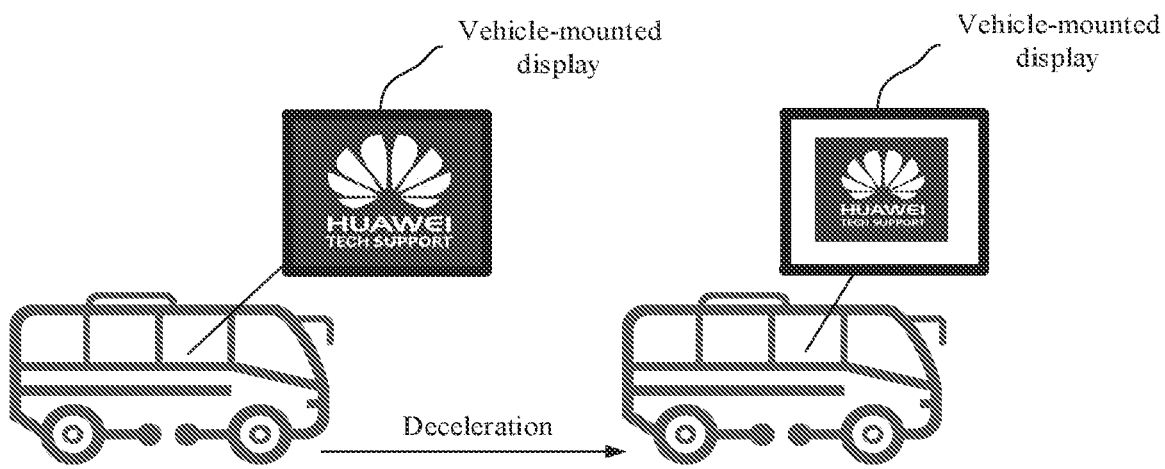
FIG. 8 is another schematic diagram of an application scenario of an image display method according to an embodiment of this application.

To better understand how to display an image in the deceleration scenario in the solutions provided in this application, the following describes the deceleration scenario with reference to a specific application scenario. FIG. 8 is a schematic diagram of an application scenario of an image display method according to an embodiment of this application. As shown in FIG. 8, when a vehicle travels on a road, if it is determined, based on motion information of the vehicle, that the vehicle is traveling at a decelerated speed, the first image displayed on a vehicle-mounted display on the vehicle is zoomed out. For a zoom-out proportion, a zoom-out speed, and a zoom-out time, refer to step 602. Details are not described herein again. It should be noted that, in FIG. 8, to better reflect an image zoom-out process in this solution, a same image is selected for zoom-out display. In an actual scenario, the vehicle-mounted display may play a video, that is, a continuous image. In a deceleration process, zoom-out processing is performed on the image that is being played by the vehicle-mounted display. It should be noted that, in the scenario shown in FIG. 8, the image display method provided in this application is described by using an example in which the vehicle is a bus, and in the scenario shown in FIG. 6, the image display method provided in this application is described by using an example in which the vehicle is a sedan. This does not mean that the solution provided in this application can be used only for the two types of vehicles. Actually, a type of the vehicle is not limited in the solutions provided in this application. For example, the vehicle may be a car, a truck, a motorcycle, a bus, a boat, a lawn mower, a recreational vehicle, a playground vehicle, a construction device, a trolley, a golf cart, or a handcart provided that a vehicle-mounted display is installed.

3. Uphill Scenario

Figure 9:
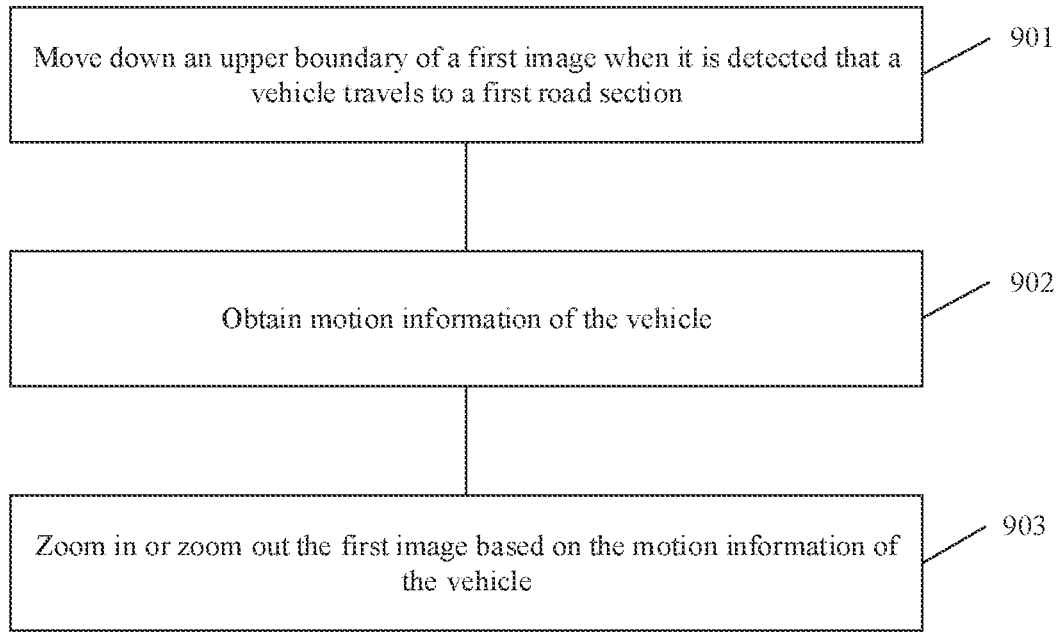
FIG. 9 is another schematic flowchart of an image display method according to an embodiment of this application.

FIG. 9 is a schematic flowchart of an image display method according to an embodiment of this application.

As shown in FIG. 9, an image display method provided in an embodiment of this application may include the following steps.

901: Move down an upper boundary of a first image when it is detected that a vehicle travels to a first road section.

In a possible implementation, the first road section is an uphill road section on which the vehicle travels in front of the vehicle and that is predicted based on navigation information of the vehicle and a high-precision map, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

It should be noted that the road section on which the vehicle travels in front of the vehicle may be predicted, in another manner, that the road section is an uphill road section. For example, in a possible implementation, the first road section is an uphill road section on which the vehicle travels in front of the vehicle and that is predicted based on the navigation information of the vehicle and a sensor, where the sensor may include an image sensor. An image including the uphill road section may be used as training data to train a model, so that the trained model can identify the uphill road section. When the vehicle travels, the data obtained by using the image sensor may be used as input data of the model, and whether a road section on which the vehicle travels in front of the vehicle is an uphill road section may be determined based on output data of the model. It should be noted that a type of the model is not limited in this embodiment of this application. For example, the model may be any model used for image recognition or image detection.

The first rate is an initial rate at which the vehicle goes uphill, that is, the vehicle goes uphill at the first rate. Due to an effect of gravity, a deceleration is generated. A speed after the vehicle goes uphill is represented by using formula 3-1:

$$v'=v*\cot(\alpha) \quad (3\text{-}1)$$

v' represents the speed of the vehicle after the vehicle goes uphill, v represents the first rate, and α represents an included angle between a direction of v and a slope. α may be obtained by using the high-precision map.

The acceleration during uphill may be represented by using formula 3-2:

$$a_3=(v'-v)/t_3=(v*\cot(\alpha)-v)/t_3=v*(\cot(\alpha)-1)/t_3 \quad (3\text{-}2)$$

The proportion of moving down the upper boundary of the first image may be represented by using the following formula 3-3:

$$X1=k_3' \tan h(v*|(\cot(\alpha)-1)|*t_3) \quad (3\text{-}3)$$

X1 indicates the proportion of moving down the upper boundary of the first image. $k3'$ represents an adjustment coefficient. A value of $k3'$ may be adjusted, so that the proportion of moving down the upper boundary of the first image better meets passenger feelings. tanh ( ) represents a compression function, and is used to simulate a curve in which an acceleration of an automobile within a small range changes. It should be noted that a type of the compression function is not limited in this application. $t_3$ represents the third duration.

In addition, to ensure integrity of the first image, in a possible implementation, the lower boundary of the first image may be kept unchanged.

902: Obtain motion information of the vehicle.

Step 902 may be understood with reference to step 201 in the embodiment corresponding to FIG. 2. Details are not described herein again.

903: Zoom in or zoom out the first image based on the motion information of the vehicle.

For understanding of step 903, refer to step 202 in the embodiment corresponding to FIG. 2, step 302 in the embodiment corresponding to FIG. 3, and step 602 in the embodiment corresponding to FIG. 6. Details are not described herein again.

Figure 10:
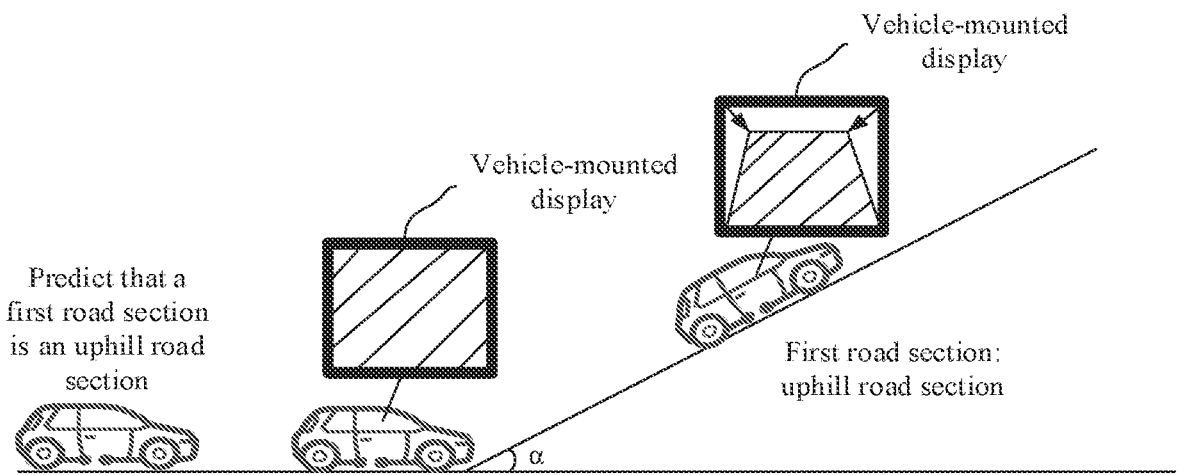
FIG. 10 is another schematic diagram of an application scenario of an image display method according to an embodiment of this application.

Because the vehicle usually decelerates when going uphill, the first image is usually zoomed out, and the upper boundary of the first image is moved down. The following describes, with reference to this scenario, how to display the image in the uphill scenario. FIG. 10 is a schematic diagram of an application scenario of an image display method according to an embodiment of this application. When a vehicle travels on a road, if it is predicted, based on navigation information and a high-precision map, that a road section on which the vehicle travels in front of the vehicle is an uphill road section, an upper boundary of a first image is moved down when the vehicle passes through the uphill road section. In addition, to maintain integrity of the image, a lower boundary of the first image remains unchanged. If the vehicle decelerates on the uphill road section, the first image further needs to be zoomed out. It should be noted that in this scenario, the lower boundary of the first image remains unchanged, and the first image is zoomed out. It should be noted that if the vehicle accelerates uphill, the first image is zoomed in, and the upper boundary of the first image is moved down.

4. Downhill Scenario

Figure 11:
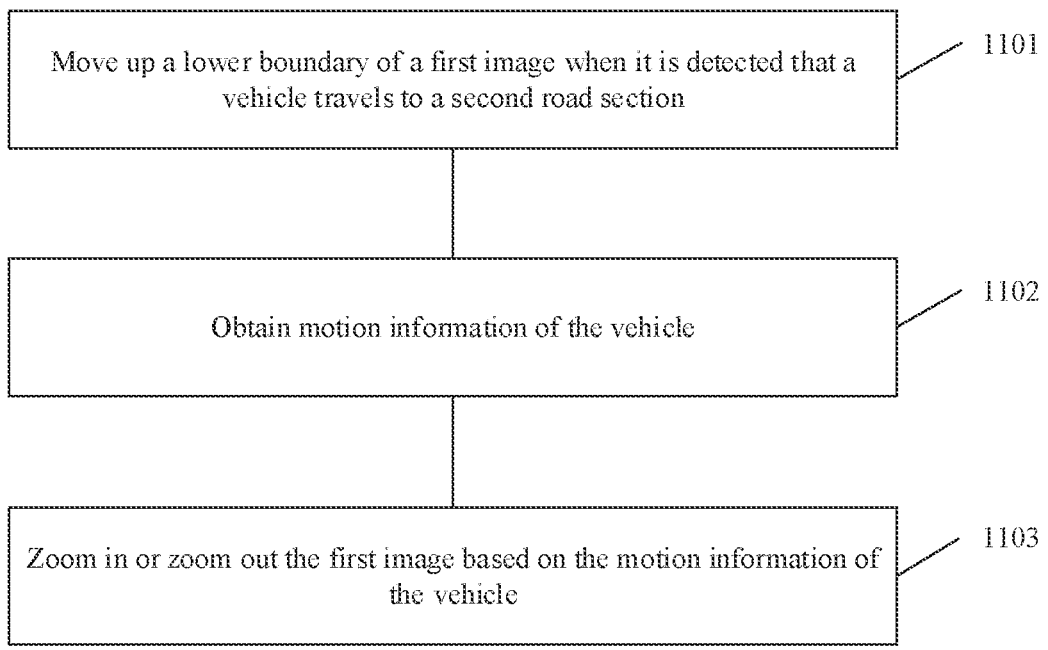
FIG. 11 is another schematic flowchart of an image display method according to an embodiment of this application.

FIG. 11 is a schematic flowchart of an image display method according to an embodiment of this application.

As shown in FIG. 11, an image display method provided in an embodiment of this application may include the following steps.

1101: Move up a lower boundary of the first image when it is detected that the vehicle travels to a second road section.

The second road section is a downhill road section on which the vehicle travels in front of the vehicle and that is predicted based on navigation information of the vehicle and a high-precision map. A proportion of moving up the lower boundary of the first image is determined based on gravity acceleration and fourth duration. The fourth duration is duration for the vehicle to travel through the second road section.

It should be noted that the road section on which the vehicle travels in front of the vehicle may be predicted, in another manner, that the road section is a downhill road section. For example, in a possible implementation, the second road section is a downhill road section on which the vehicle travels in front of the vehicle and that is predicted based on the navigation information of the vehicle and a sensor, where the sensor may include an image sensor. An image including the downhill road section may be used as training data to train a model, so that the trained model can identify the downhill road section. When the vehicle travels, the data obtained by using the image sensor may be used as input data of the model, and whether a road section on which the vehicle travels in front of the vehicle is a downhill road section may be determined based on output data of the model. It should be noted that a type of the model is not limited in this embodiment of this application. For example, the model may be any model used for image recognition or image detection.

Because a front wheel of the vehicle is suspended, downward gravity acceleration g is generated. The proportion of moving down the upper boundary of the first image may be represented by using the following formula 4-1:

$$X_2 = k_4' \tan h(g t_4^2) \quad (4\text{-}1)$$

K4' represents an adjustment coefficient. A value of k4' may be adjusted, so that the proportion of moving up the lower boundary of the first image better meets passenger feelings. tan h( ) represents a compression function, and is used to simulate a curve in which an acceleration of an automobile within a small range changes. It should be noted that a type of the compression function is not limited in this application. ta represents the fourth duration.

In addition, to ensure integrity of the first image, in a possible implementation, the upper boundary of the first image may be kept unchanged.

1102: Obtain motion information of the vehicle.

Step 1102 may be understood with reference to step 201 in the embodiment corresponding to FIG. 2. Details are not described herein again.

1103: Zoom in or zoom out the first image based on the motion information of the vehicle.

For understanding of step 1103, refer to step 202 in the embodiment corresponding to FIG. 2, step 302 in the embodiment corresponding to FIG. 3, and step 602 in the embodiment corresponding to FIG. 6. Details are not described herein again.

Figure 12:
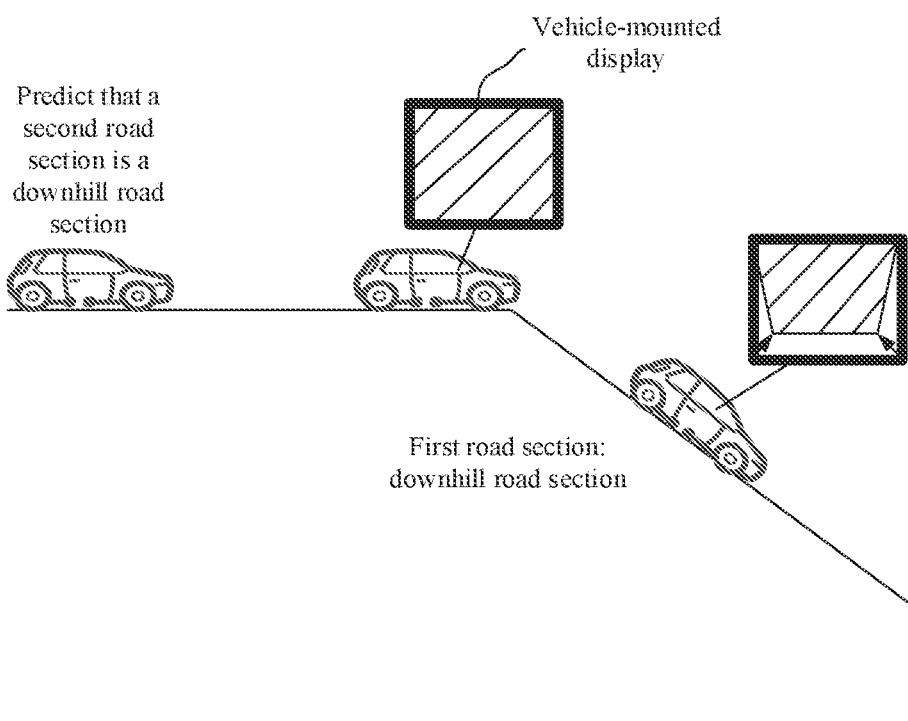
FIG. 12 is another schematic diagram of an application scenario of an image display method according to an embodiment of this application.

When the vehicle is downhill, a driver usually steps on a brake pedal to decelerate the vehicle. Therefore, the first image is usually zoomed out, and the lower boundary of the first image is moved up. The following describes, with reference to this scenario, how to display an image in a downhill scenario. FIG. 12 is a schematic diagram of an application scenario of an image display method according to an embodiment of this application. When the vehicle travels on the road, if it is predicted, based on the navigation information and the high-precision map, that the road section on which the vehicle travels in front of the vehicle is a downhill road section, the lower boundary of the first image is moved up when the vehicle passes through the downhill road section. In addition, to maintain integrity of the image, the upper boundary of the first image remains unchanged. If the vehicle decelerates on the downhill road section, the first image further needs to be zoomed out. It should be noted that in this scenario, the upper boundary of the first image remains unchanged, and the first image is zoomed out. It should be noted that if the vehicle does not step on the brake pedal when the vehicle is downhill, the lower boundary of the first image is moved up, and the first image is zoomed in at the same time.

4. Turning Scenario

Figure 13:
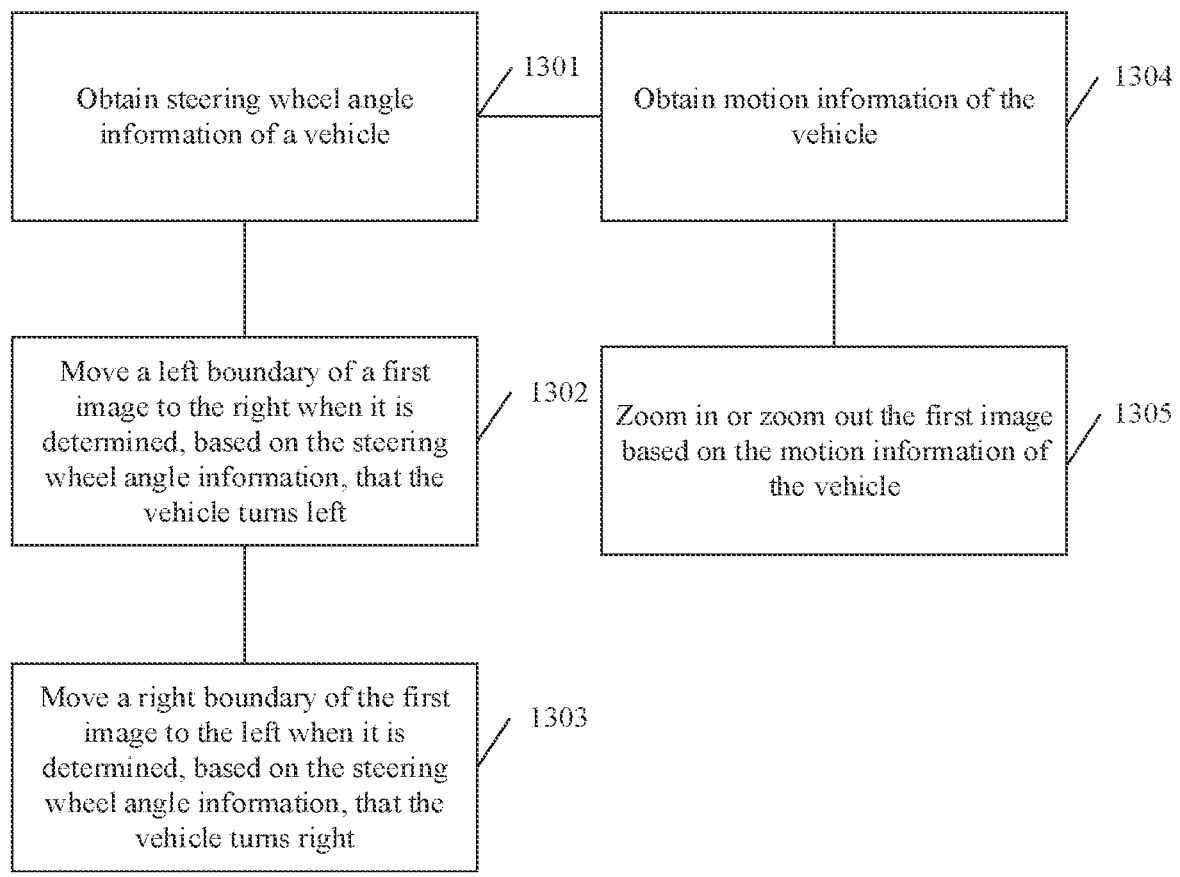
FIG. 13 is another schematic flowchart of an image display method according to an embodiment of this application.

FIG. 13 is a schematic flowchart of an image display method according to an embodiment of this application.

As shown in FIG. 13, an image display method provided in an embodiment of this application may include the following steps.

1301: Obtain steering wheel angle information of a vehicle.

In a possible implementation, the steering wheel angle information of the vehicle may be obtained based on a sensor disposed on a steering wheel.

In a possible implementation, it may be predicted, based on the high-precision map and the navigation information, that the vehicle is about to turn, a steering wheel angle is predicted based on the high-precision map, and the steering wheel angle information of the vehicle is determined based on the predicted steering wheel angle.

1302: Move a left boundary of a first image to the right when it is determined, based on the steering wheel angle information, that the vehicle turns left.

A proportion of moving the left boundary to the right is determined based on a second rate and fifth duration. The second rate is a rate of the vehicle when it is determined, based on the steering wheel angle information, that the vehicle turns left, and the fifth duration is duration, determined based on the steering wheel angle information, from a time when the vehicle turns left to a time when the vehicle stops turning left.

In the turning scenario, centrifugal force is generated due to inertia when the vehicle is turning. A centrifugal speed is a tangent speed, that is, a vehicle speed $v_0$.

The proportion of moving the left boundary to the right may be represented by using the following formula 5-1:

$$X_3 = k_5' \tan h(v_0 t_5) \quad (5\text{-}1)$$

$k_5'$ represents an adjustment coefficient. A value of $k_5'$ may be adjusted, so that a proportion of moving the left boundary of the first image to the right better meets passenger experience. $\tan h(\ )$ represents a compression function, and is used to simulate a curve in which an acceleration of an automobile within a small range changes. It should be noted that a type of the compression function is not limited in this application. $t_5$ represents the fifth duration.

1303: Move a right boundary of the first image to the left when it is determined, based on the steering wheel angle information, that the vehicle turns right.

A proportion of moving the right boundary to the left is determined based on a third rate and sixth duration. The third rate is a rate of the vehicle when it is determined, based on the steering wheel angle information, that the vehicle turns right, and the sixth duration is duration, determined based on the steering wheel angle information, from a time when the vehicle turns right to a time when the vehicle stops turning left.

The proportion of moving the right boundary to the left may be represented by using the following formula 5-2:

$$X_6 = k_6' \tan h(v_0 t_6) \quad (5\text{-}2)$$

$k_6'$ represents an adjustment coefficient. A value of $k_6'$ may be adjusted, so that the proportion of moving the right boundary of the first image to the left better meets passenger feelings. $\tan h(\ )$ represents a compression function, and is used to simulate a curve in which an acceleration of an automobile within a small range changes. It should be noted that a type of the compression function is not limited in this application, $t_6$ represents the fifth duration.

It should be noted that the vehicle may be predicted, in another manner, that the vehicle is about to turn. For example, in a possible implementation, a left boundary of the first image is moved to the right when it is detected that the vehicle travels to a third road section, where the third road section is a left-turn road section on which the vehicle travels in front of the vehicle and that is predicted based on navigation information of the vehicle and a sensor, a proportion of moving the left boundary to the right is determined based on a second rate and fifth duration, the second rate is a rate of the vehicle when the vehicle travels to the third road section, and the fifth duration is for the vehicle to travel through the third road section.

The right boundary of the first image is moved to the left when it is detected that the vehicle travels to a fourth road section, where the fourth road section is a right-turn road section on which the vehicle travels in front of the vehicle and that is predicted based on the navigation information of the vehicle and a sensor, a proportion of moving the right boundary to the left is determined based on a third rate and sixth duration, the third rate is a rate of the vehicle when the vehicle travels to the fourth road section, and the sixth duration is duration for the vehicle to travel through the fourth road section.

For example, an image including the turning section may be used as training data to train the model, so that the trained model can identify the turning section. When the vehicle travels, data obtained by using the image sensor may be used to as input data of the model, and whether the road section on which the vehicle travels in front of the vehicle is a turning road section may be determined based on output data of the model. In an example, whether the road section is a left-turn road section or a right-turn road section may be determined. It should be noted that a type of the model is not limited in this embodiment of this application. For example, the model may be any model used for image recognition or image detection.

1304: Obtain motion information of the vehicle.

Step 1304 may be understood with reference to step 201 in the embodiment corresponding to FIG. 2. Details are not described herein again.

1305: Zoom in or zoom out the first image based on the motion information of the vehicle.

For understanding of step 1305, refer to step 202 in the embodiment corresponding to FIG. 2, step 302 in the embodiment corresponding to FIG. 3, and step 602 in the embodiment corresponding to FIG. 6. Details are not described herein again.

Figure 14A:
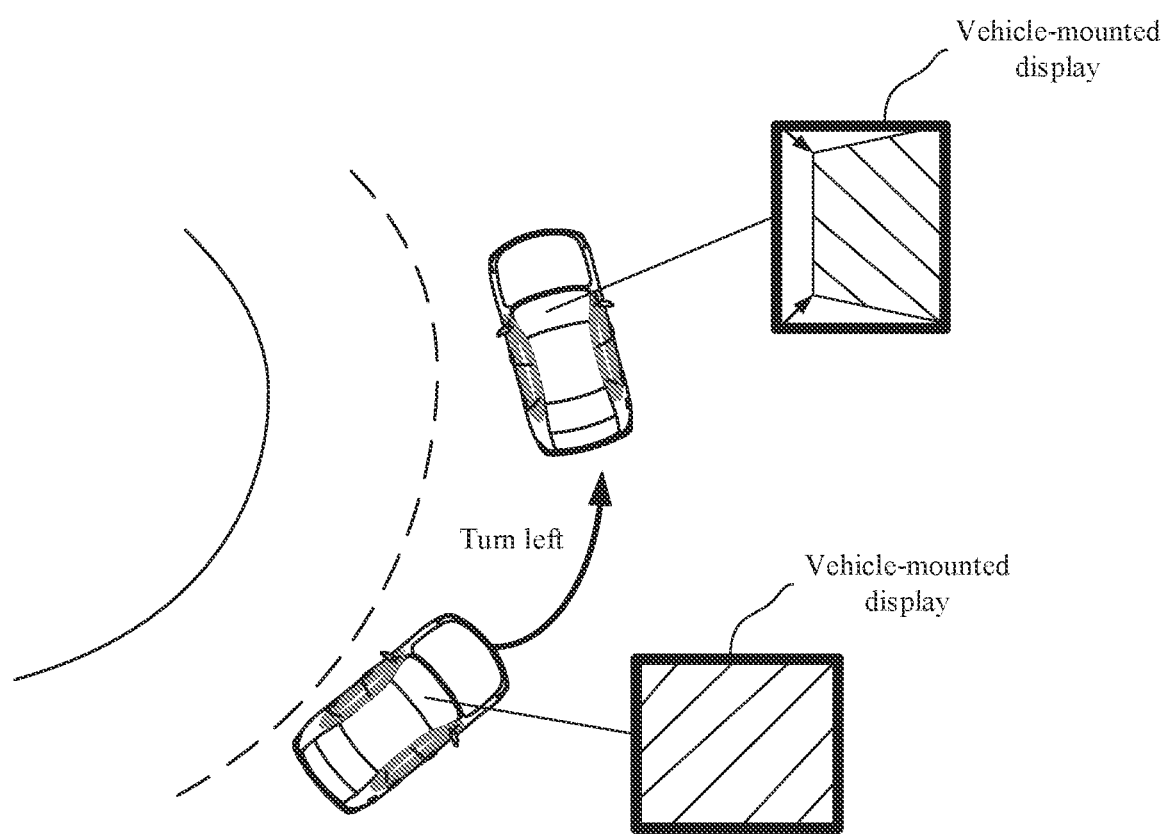
FIG. 14A is another schematic diagram of an application scenario of an image display method according to an embodiment of this application.
Figure 14B:
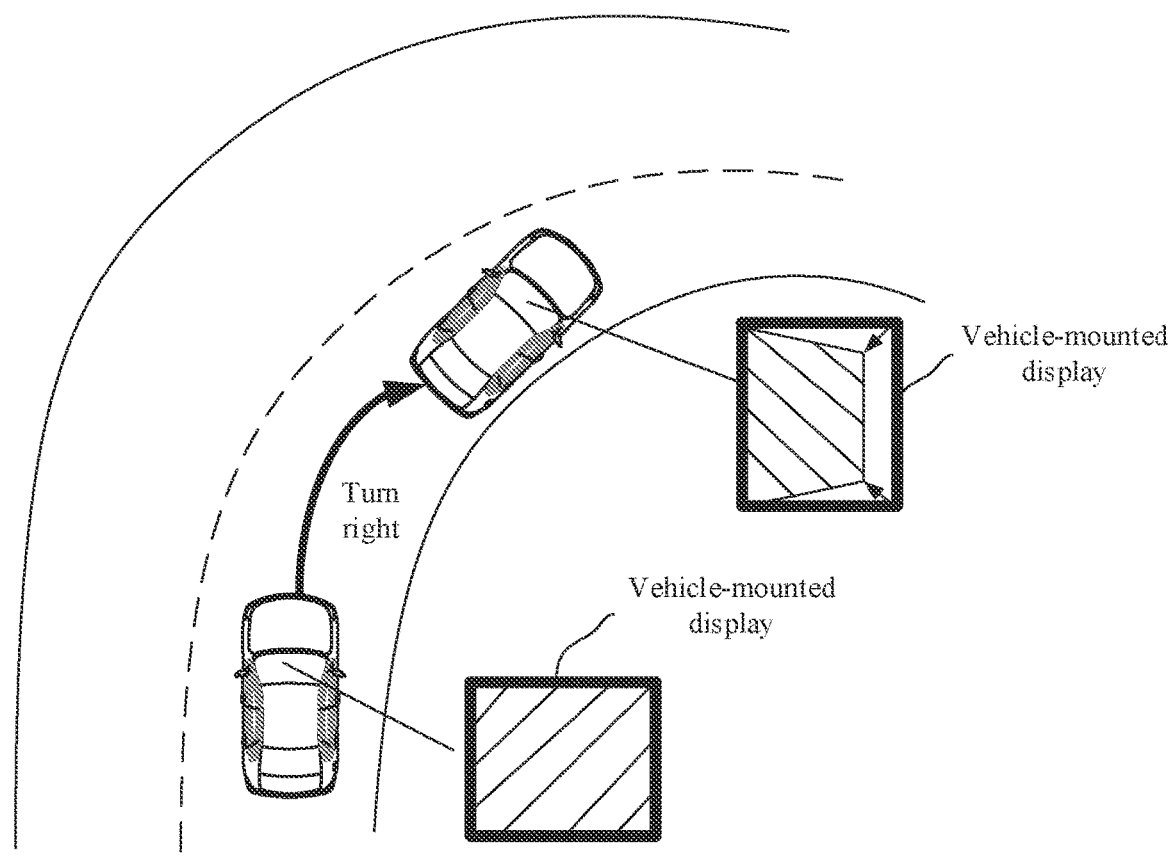
FIG. 14B is another schematic diagram of an application scenario of an image display method according to an embodiment of this application.

When the vehicle is turning, the vehicle usually decelerates. Therefore, the first image is usually zoomed out, and the left boundary is moved to the right, or the right boundary is moved to the left. The following describes, with reference to this scenario, how to display an image in a turning scenario. FIG. 14A is a schematic diagram of an application scenario of an image display method according to an embodiment of this application. When the vehicle travels on the road, if it is predicted, based on the steering wheel angle information, that the vehicle turns left, the left boundary of the first image is moved to the right. In addition, to maintain integrity of the image, the right boundary of the first image remains unchanged. If the vehicle decelerates when turning left, the first image needs to be zoomed out. It should be noted that, in this scenario, the right boundary of the first image remains unchanged, and the first image is zoomed out. FIG. 14B is a schematic diagram of an application scenario of an image display method according to an embodiment of this application. When the vehicle travels on the road, if it is predicted, based on the steering wheel angle information, that the vehicle turns right, the right boundary of the first image is moved to the left. In addition, to maintain integrity of the image, the left boundary of the first image remains unchanged. If the vehicle decelerates when turning right, the first image further needs to be zoomed out. It should be noted that in this scenario, the left boundary of the first image remains unchanged, and the first image is zoomed out. It should be noted that, if the vehicle does not decelerate when the vehicle turns, the first image is zoomed in, and at the same time, the left boundary is moved to the right, or the right boundary is moved to the left.

Figure 15A:
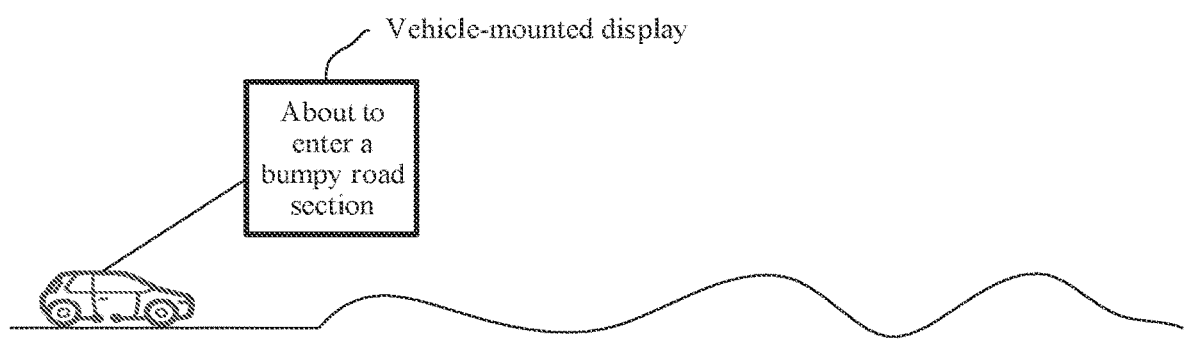
FIG. 15A is another schematic diagram of an application scenario of an image display method according to an embodiment of this application.
Figure 15B:
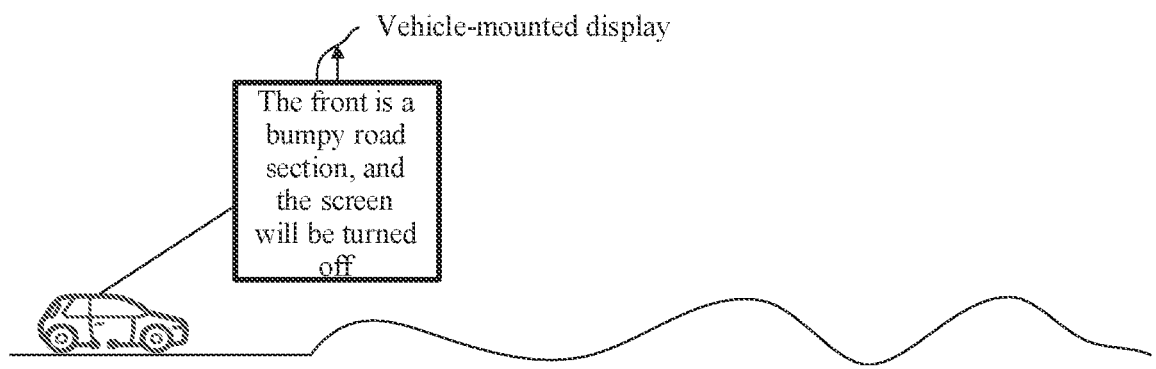
FIG. 15B is another schematic diagram of an application scenario of an image display method according to an embodiment of this application.

In an actual running process of the vehicle, in addition to the acceleration scenario, the acceleration scenario, the uphill scenario, the downhill scenario, and the turning scenario mentioned above, there may be another more complex scenario. In a more complex scenario, it may be impossible to accurately zoom in or zoom out an image based on the motion information of the vehicle in the foregoing several scenarios. In such a complex scenario, a prompt message may be sent to prompt a passenger, or a screen of a vehicle-mounted display may be temporarily turned off. The following provides description with reference to two examples. FIG. 15A and FIG. 15B are schematic diagrams of application scenarios of another image display method according to an embodiment of this application. As shown in FIG. 15A, a vehicle travels on a road. If the vehicle predicts that the road ahead is a bumpy road section, the vehicle may send a text prompt by using a screen of a vehicle-mounted display, or the vehicle may send a voice prompt, to notify a passenger that the road ahead is the bumpy road section. There may be a plurality of manners in which the vehicle predicts that the road ahead is the bumpy road section. For example, the vehicle may identify, by using a visual sensor, that the road ahead is the bumpy road section. For another example, as shown in FIG. 15B, if the vehicle predicts that the road ahead is a bumpy road section, the vehicle may temporarily turn off the screen of the vehicle-mounted display, and turn on the screen of the vehicle-mounted display again after driving through the bumpy road section.

Figure 16:
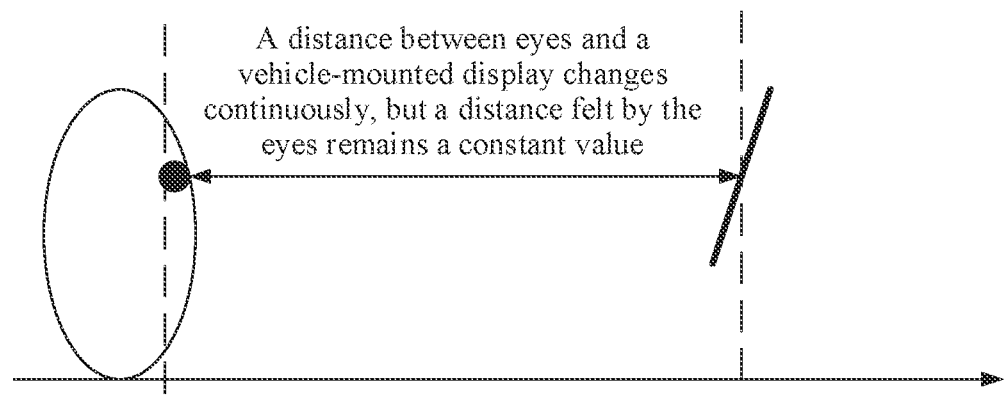
FIG. 16 is a schematic diagram of a principle of relieving visual fatigue in an image display method according to this application.

In addition, according to the solutions provided in this application, visual fatigue caused by watching a video by a passenger can be further alleviated. The following provides description with reference to FIG. 16. Human eyes may inertially move relative to a vehicle body due to scenarios such as acceleration, deceleration, and turning of the vehicle. As a result, it is clear that a distance between the human eyes and a physical screen changes, where the physical screen is a screen of a vehicle-mounted display. However, because the screen of the vehicle-mounted display is fastened on the vehicle, inertial displacement does not occur with the vehicle. An image is changed based on the distance between the human eyes and the screen, and a virtual image change may be performed based on a line-of-sight unchanged principle and a motion signal of a vehicle, so as to reduce or alleviate a change of a line-of-sight of the human eyes. In other words, according to the solution provided in this application, a relative position between the human eyes and an image (non-physical screen) can be controlled to remain at a stable value, to reduce frequent line-of-sight changes of eyeballs, thereby relieving visual fatigue.

It should be understood that the image display method provided in this application may be performed by an electronic apparatus. The electronic apparatus may be an entire computing device, or may be some components in this computing device. In an example, the electronic apparatus may be a terminal such as an automobile or an image display apparatus in an automobile. A system chip is also referred to as a system on chip, or referred to as a SoC chip. Based on the embodiments corresponding to FIG. 2 to FIG. 16, to better implement the foregoing solutions in the embodiments of this application, the following further provides a related device configured to implement the foregoing solutions.

Figure 17:
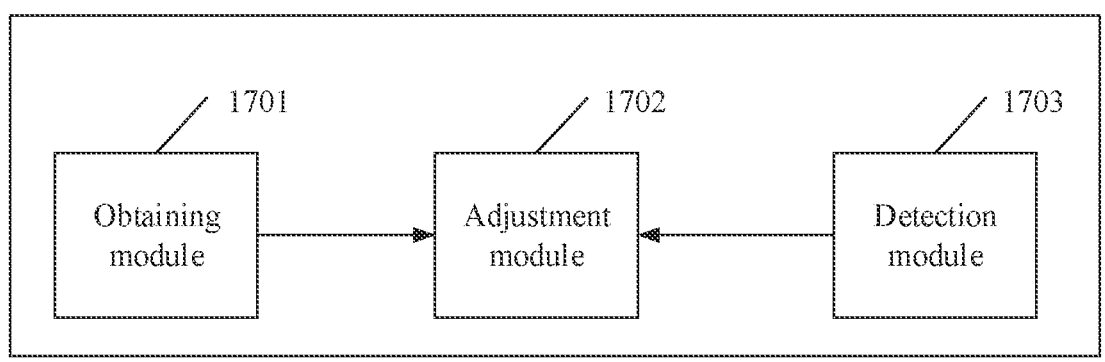
FIG. 17 is a schematic diagram of a structure of an image display apparatus according to an embodiment of this application.

FIG. 17 is a schematic diagram of a structure of an image display apparatus according to an embodiment of this application. The image display apparatus provided in this application may include an obtaining module 1701, an adjustment module 1702, and a detection module 1703.

In a possible implementation, an image display apparatus includes an obtaining module 1701, configured to obtain motion information of a vehicle, where the motion information includes at least one of first information, an upper-layer ADAS instruction, and a predicted motion track of the vehicle, the first information includes at least one of displacement information of a brake pedal, displacement information of an acceleration pedal, and steering wheel angle information, and the ADAS instruction is used to instruct the vehicle to travel at an accelerated speed, travel at a decelerated speed, or travel at a turning; and the adjustment module 1702, configured to zoom in on or zoom out a first image based on the motion information of the vehicle obtained by the obtaining module 1701, where the first image is an image displayed on a vehicle-mounted display of the vehicle.

In a possible implementation, the adjustment module 1702 is configured to zoom in the first image based on a first acceleration, where a zoom-in proportion of the first image is determined based on the first acceleration and first duration, the first acceleration is determined based on the displacement information of the acceleration pedal obtained by the obtaining module 1701, and the first duration is duration from a time when the displacement information of the acceleration pedal is obtained to a time when the vehicle travels at a constant speed.

In a possible implementation, the zoom-in proportion of the first image is determined based on the first acceleration, the first duration, and a preset first compression function, and the first compression function is used to simulate a curve in which the first acceleration of the vehicle within a preset distance range changes with time.

In a possible implementation, the adjustment module 1702 is configured to zoom out the first image based on a second acceleration, where a zoom-out proportion of the first image is determined based on the second acceleration and second duration, the second acceleration is determined based on the displacement information of the brake pedal obtained by the obtaining module 1701, and the second duration is duration from a time when the displacement information of the brake pedal is obtained to a time when the vehicle travels at a constant speed.

In a possible implementation, the zoom-out proportion of the first image is determined based on the second acceleration, the second duration, and a preset second compression function, and the second compression function is used to simulate a curve in which the second acceleration of the vehicle within the preset distance range changes with time.

In a possible implementation, the apparatus further includes the detection module 1703. The detection module 1703 is configured to detect location information of the vehicle. The adjustment module 1702 is further configured to move down an upper boundary of the first image when the detection module 1703 detects that the vehicle travels to a first road section, where the first road section is an uphill road section on which the vehicle travels in front of the vehicle and that is predicted based on navigation information of the vehicle and a high-precision map, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

In a possible implementation, the apparatus further includes the detection module 1703. The detection module 1703 is configured to detect location information of the vehicle. The adjustment module 1702 is further configured to move up a lower boundary of the first image when the detection module 1703 detects that the vehicle travels to a second road section, where the second road section is a downhill road section on which the vehicle travels in front of the vehicle and that is predicted based on navigation information of the vehicle and a high-precision map, a proportion of moving up the lower boundary of the first image is determined based on gravity acceleration and fourth duration, and the fourth duration is duration for the vehicle to travel through the second road section.

In a possible implementation, the obtaining module 1701 is further configured to obtain steering wheel angle information of the vehicle. The adjustment module 1702 is further configured to move a left boundary of the first image to the right when it is determined, based on the steering wheel angle information, that the vehicle turns left, where a proportion of moving the left boundary to the right is determined based on a second rate and fifth duration, the second rate is a rate of the vehicle when it is determined, based on the steering wheel angle information, that the vehicle turns left, and the fifth duration is duration, determined based on the steering wheel angle information, from a time when the vehicle turns left to a time when the vehicle stops turning left. The adjustment module 1702 is further configured to move a right boundary of the first image to the left when it is determined, based on the steering wheel angle information, that the vehicle turns right, where a proportion of moving the right boundary to the left is determined based on a third rate and sixth duration, the third rate is a rate of the vehicle when it is determined, based on the steering wheel angle information, that the vehicle turns right, and the sixth duration is duration, determined based on the steering wheel angle information, from a time when the vehicle turns right to a time when the vehicle stops turning left.

In a possible implementation, the adjustment module 1702 is configured to zoom in the first image based on a third acceleration, where a zoom-in proportion of the first image is determined based on the third acceleration and seventh duration, the third acceleration is determined based on an ADAS instruction obtained by the obtaining module 1701, the seventh duration is duration from a time when the vehicle accelerates according to the ADAS instruction to a time when the vehicle travels at a constant speed, and the ADAS instruction is used to instruct the vehicle to accelerate; or zoom out the first image based on a fourth acceleration, where a zoom-out proportion of the first image is determined based on the fourth acceleration and eighth duration, the fourth acceleration is determined according to an ADAS instruction obtained by the obtaining module 1701, the eighth duration is duration from a time when the vehicle travels at the decelerated speed that is determined according to the ADAS instruction to a time when the vehicle travels at a constant speed, and the ADAS instruction is used to instruct the vehicle to decelerate.

It should be noted that content such as information exchange and an execution process between the modules/units in the image display apparatus is based on a same concept as the method embodiments corresponding to FIG. 2 to FIG. 16 in this application. For specific content, refer to the descriptions in the foregoing method embodiments in this application. Details are not described herein again.

Figure 18:
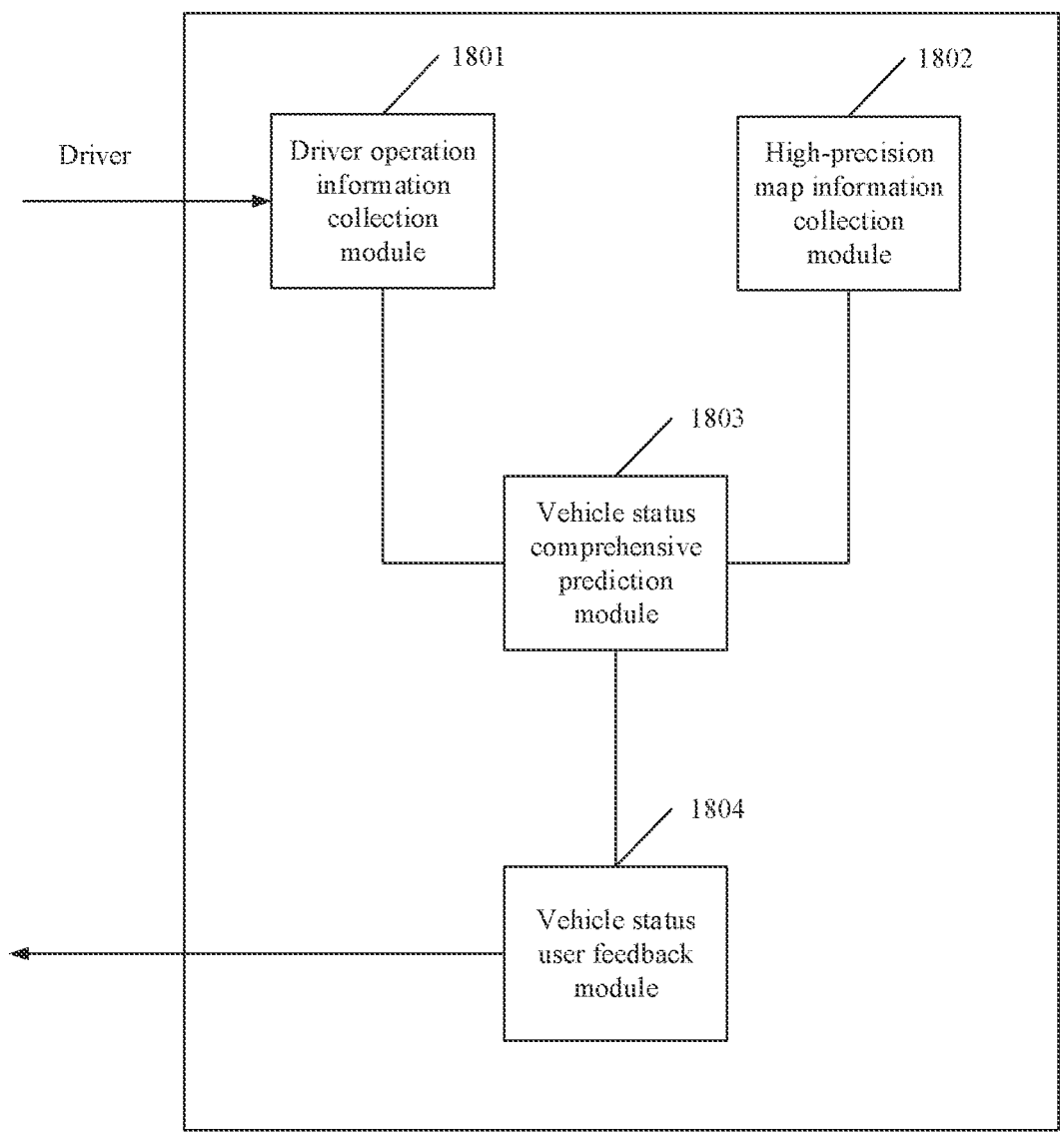
FIG. 18 is a schematic diagram of a structure of another image display apparatus according to an embodiment of this application.

In addition, it should be noted that a name of the module is not limited in this embodiment of this application. For example, FIG. 18 is a schematic diagram of a structure of another image display apparatus according to this application. The obtaining module may be divided into a driver operation information collection module and a high-precision map information collection module. Functions of the adjustment module and the detection module may be integrated, and are re-divided into a vehicle status comprehensive prediction module and a vehicle status user feedback module.

In a possible implementation, an image display apparatus includes a driver operation information collection module 1801, configured to obtain motion information of a vehicle, where the motion information includes first information, and the first information includes one or two of displacement information of a brake pedal and displacement information of an acceleration pedal; and a vehicle status user feedback module 1804, configured to zoom in or zoom out the first image based on the motion information of the vehicle obtained by the driver operation information collection module 1801, where the first image is an image displayed on a vehicle-mounted display of the vehicle.

In a possible implementation, when the vehicle status comprehensive prediction module 1803 predicts that the vehicle is about to travel at the accelerated speed, the vehicle status user feedback module 1804 is configured to zoom in the first image based on the first acceleration, where a zoom-in proportion of the first image is determined by the vehicle status comprehensive prediction module 1803 based on the first acceleration and first duration, the first acceleration is determined based on the displacement information of the acceleration pedal obtained by the driver operation information collection module 1801, and the first duration is duration from a time when the displacement information of the acceleration pedal is obtained to a time when the vehicle travels at a constant speed.

In a possible implementation, the zoom-in proportion of the first image is determined based on the first acceleration, the first duration, and a preset first compression function, and the first compression function is used to simulate a curve in which the first acceleration of the vehicle within a preset distance range changes with time.

In a possible implementation, when the vehicle status comprehensive prediction module 1803 predicts that the vehicle is about to travel at a decelerated speed, the vehicle status user feedback module 1804 is configured to zoom out the first image based on the second acceleration, where a zoom-out proportion of the first image is determined by the vehicle status comprehensive prediction module 1803 based on the second acceleration and second duration, the second acceleration is determined based on the displacement information of the brake pedal obtained by the obtaining module 1701, and the second duration is duration from a time when the displacement information of the brake pedal is obtained to a time when the vehicle travels at a constant speed.

In a possible implementation, the zoom-out proportion of the first image is determined based on the second acceleration, the second duration, and a preset second compression function, and the second compression function is used to simulate a curve in which the second acceleration of the vehicle within the preset distance range changes with time.

In a possible implementation, the vehicle status user feedback module 1804 is configured to move down an upper boundary of the first image when the vehicle travels to a first road section, where the first road section is an uphill road section on which the vehicle travels in front of the vehicle that is predicted by the vehicle status comprehensive prediction module 1803 based on the navigation information of the vehicle collected by the high-precision map information collection module 1802 and the high-precision map, a proportion of moving down the upper boundary of the first image is determined based on a first slope, a first rate, and third duration, the first slope is a slope of the first road section that is determined based on the high-precision map, the first rate is a rate at which the vehicle travels to the first road section, and the third duration is duration for the vehicle to travel through the first road section.

In a possible implementation, the vehicle status user feedback module 1804 is configured to move up a lower boundary of the first image when the vehicle travels to a second road section, where the second road section is a downhill road section on which the vehicle travels in front of the vehicle and that is predicted by the vehicle status comprehensive prediction module 1803 based on the navigation information of the vehicle collected by the high-precision map information collection module 1802 and the high-precision map, a proportion of moving up the lower boundary of the first image is determined based on gravity acceleration and fourth duration, and the fourth duration is duration for the vehicle to travel through the second road section.

In a possible implementation, the driver operation information collection module 1801 is further configured to obtain steering wheel angle information of the vehicle. The vehicle status user feedback module 1804 is further configured to move a left boundary of the first image to the right when it is determined, based on the steering wheel angle information, that the vehicle turns left, where a proportion of moving the left boundary to the right is determined based on a second rate and fifth duration, the second rate is a rate of the vehicle when it is determined, based on the steering wheel angle information, that the vehicle turns left, and the fifth duration is duration, determined based on the steering wheel angle information, from a time when the vehicle turns left to a time when the vehicle stops turning left. The vehicle status user feedback module 1804 is further configured to move a right boundary of the first image to the left when it is determined, based on the steering wheel angle information, that the vehicle turns right, where a proportion of moving the right boundary to the left is determined based on a third rate and sixth duration, the third rate is a rate of the vehicle when it is determined, based on the steering wheel angle information, that the vehicle turns right, and the sixth duration is duration, determined based on the steering wheel angle information, from a time when the vehicle turns right to a time when the vehicle stops turning left.

Figure 19:
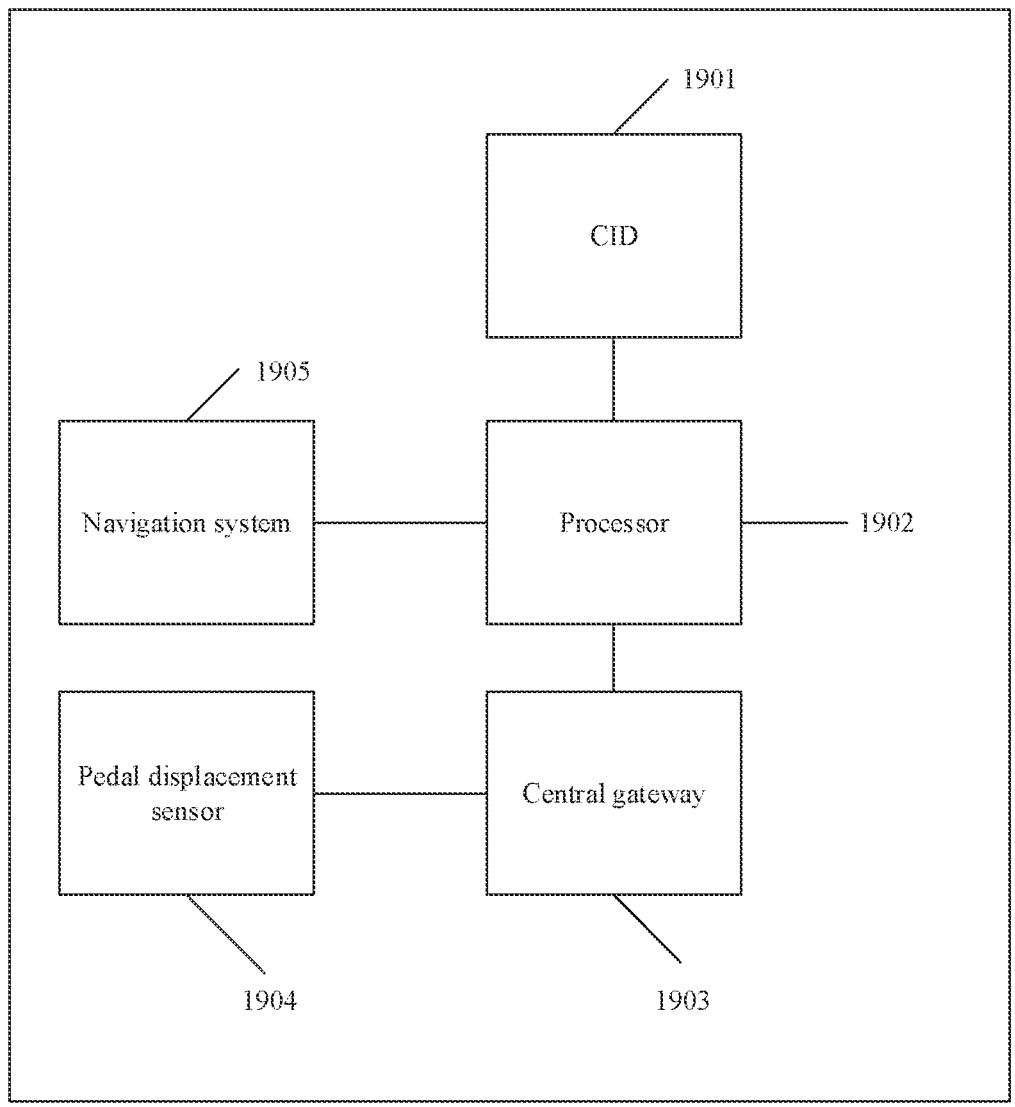
FIG. 19 is a schematic diagram of a structure of an automobile according to an embodiment of this application.

An embodiment of this application further provides a vehicle. With reference to the foregoing description of FIG. 1A, FIG. 19 is a schematic diagram of a structure of a vehicle according to an embodiment of this application. The image display apparatus described in the embodiment corresponding to FIG. 17 or FIG. 18 may be deployed on the vehicle, to implement functions of the vehicle in the embodiments corresponding to FIG. 2 to FIG. 16.

In a possible implementation, the vehicle includes a processor, the processor is coupled to a memory, the memory stores program instructions, and when the program instructions stored in the memory are executed by the processor, the method described in FIG. 2 to FIG. 16 is performed.

In a possible implementation, as shown in FIG. 19, the vehicle includes a central information display (CID) 1901, a processor 1902, a navigation system 1905, a central gateway (1903), and a pedal displacement sensor 1904. In a possible implementation, the pedal displacement sensor is configured to obtain motion information of the vehicle. The processor is configured to zoom in or zoom out the first image based on the motion information of the vehicle. The navigation system is used to provide high-precision map information. The central gateway is configured to forward information. The central information display is configured to present the first image and present a zoom-in or zoom-out process of the first image.

It should be noted that for specific implementations and beneficial effects of the image display apparatus and the image display method performed by the vehicle, refer to descriptions in the method embodiments corresponding to FIG. 2 to FIG. 16. Details are not described herein again.

An embodiment of this application further provides a computer-readable storage medium. The computer-readable storage medium stores a program used for image display. When the program runs on a computer, the computer is enabled to perform the steps performed by the vehicle and the image display apparatus in the methods described in the embodiments shown in FIG. 2 to FIG. 16.

An embodiment of this application further provides a computer program product. When the computer program product is run on a computer, the computer is enabled to perform the steps performed by the vehicle and the image display apparatus in the methods described in the embodiments shown in FIG. 2 to FIG. 16. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid state disk (SSD)), or the like.

An embodiment of this application further provides a circuit system. The circuit system includes a processing circuit and a storage circuit. The processing circuit and the storage circuit are configured to perform the steps performed by the vehicle and the image display apparatus in the methods described in the embodiments shown in FIG. 2 to FIG. 16. The processing circuit may be any suitable type of computing unit, for example, a microprocessor, a digital signal processor (DSP), a field-programmable gate array (FPGA), or an application-specific integrated circuit (ASIC) or any other form of circuit. The storage circuit may be volatile and/or non-volatile. For example, the storage circuit may be a register, a cache, or the like. In an example, the volatile storage circuit may include a cache memory, and the non-volatile storage circuit may include a flash memory.

The image display apparatus or the vehicle provided in the embodiments of this application may be a chip. The chip includes a processing unit and a communications unit. The processing unit may be, for example, a processor, and the communications unit may be, for example, an input/output interface, a pin, or a circuit. The processing unit may execute the computer executable instruction stored in the storage unit, so that the chip in the server performs the image display method described in the embodiments shown in FIG. 2 to FIG. 16. Optionally, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random-access memory (RAM).

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be implemented as one or more communications buses or signal cables.

Based on the description of the foregoing implementations, a person skilled in the art may clearly understand that this application may be implemented by software in addition to universal hardware, or certainly may be implemented by dedicated hardware, including a dedicated integrated circuit, a dedicated convolutional logic unit (CLU), a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

What is claimed is:

1. An image display apparatus, comprising:
   at least one processor; and
   at least one memory configured to store program instructions that when executed by the at least one processor cause the image display apparatus to:
      obtain motion information of a vehicle, wherein the motion information comprises at least one of first information, an upper-layer advanced driver assistant system (ADAS) instruction, or a predicted motion track of the vehicle, wherein the first information comprises at least one of displacement information of a brake pedal, displacement information of an acceleration pedal, or steering wheel angle information, and wherein the upper-layer ADAS instruction instructs the vehicle to travel at an accelerated speed, to travel at a decelerated speed, or to turn; and
      adjust a first image that is displayed on a vehicle-mounted display of the vehicle based on the motion information, wherein the first image comprises a plurality of boundaries surrounding the first image, and wherein adjusting the first image comprises moving a first boundary of the boundaries on the vehicle-mounted display without moving a second boundary of the boundaries on the vehicle-mounted display.

2. The image display apparatus of claim 1, wherein the instructions when executed by the at least one processor further cause the image display apparatus to perform zooming adjustment on the first image within the boundaries based on the motion information of the vehicle.

3. The image display apparatus of claim 1, wherein the instructions when executed by the at least one processor further cause the image display apparatus to zoom in the first image within the boundaries based on a first acceleration, wherein a zoom-in proportion of the first image is based on the first acceleration and a first duration, wherein the first acceleration is based on the displacement information of the acceleration pedal, and wherein the first duration is from a time when the displacement information of the acceleration pedal is obtained to a time when the vehicle travels at a constant speed.

4. The image display apparatus of claim 3, wherein the zoom-in proportion is based on the first acceleration, the first duration, and a preset first compression function, and wherein the first compression function simulates a curve in which the first acceleration of the vehicle within a preset distance range changes with time.

5. The image display apparatus of claim 1, wherein the instructions when executed by the at least one processor further cause the image display apparatus to zoom out the first image within the boundaries based on a second acceleration, wherein a zoom-out proportion of the first image is based on the second acceleration and a second duration, wherein the second acceleration is based on the displacement information of the brake pedal, and wherein the second duration is from a time when the displacement information of the brake pedal is obtained to a time when the vehicle travels at a constant speed.

6. The image display apparatus of claim 5, wherein the zoom-out proportion of the first image within the boundaries is based on the second acceleration, the second duration, and a preset second compression function, and wherein the second compression function simulates a curve in which the second acceleration of the vehicle within a preset distance range changes with time.

7. The image display apparatus of claim 1, wherein the instructions when executed by the at least one processor further cause the image display apparatus to:
   detect that the vehicle travels on a first road section, wherein the first road section is an uphill road section that is in front of the vehicle and that is predicted based on navigation information of the vehicle and a high-precision map; and
   move down an upper boundary of the boundaries and in response to detecting that the vehicle travels on the first road section, wherein a proportion of moving down the upper boundary is based on a first slope, a first rate, and a third duration, wherein the first slope is a slope of the first road section that is based on the high-precision map, wherein the first rate is a rate the vehicle travels to the first road section, and wherein the third duration is a duration for the vehicle to travel through the first road section.

8. The image display apparatus of claim 1, wherein the instructions when executed by the at least one processor further cause the image display apparatus to:
   detect that the vehicle travels on a first road section, wherein the first road section is an uphill road section that is in front of the vehicle and that is predicted based on data from an image sensor of the vehicle; and
   move down an upper boundary of the boundaries and in response to detecting that the vehicle travels on the first road section, wherein a proportion of moving down the upper boundary is based on a first slope, a first rate, and a third duration, wherein the first slope is a slope of the first road section that is based on a high-precision map, wherein the first rate is a rate the vehicle travels to the first road section, and wherein the third duration is a duration for the vehicle to travel through the first road section.

9. The image display apparatus of claim 1, wherein the instructions when executed by the at least one processor further cause the image display apparatus to:
    detect that the vehicle travels on a second road section, wherein the second road section is a downhill road section that is in front of the vehicle and that is based on navigation information of the vehicle and a high-precision map; and
    move up a lower boundary of the boundaries and in response to detecting that the vehicle travels on the second road section, wherein a proportion of moving up the lower boundary is based on gravity acceleration and a fourth duration, and wherein the fourth duration is a duration for the vehicle to travel through the second road section.

10. The image display apparatus of claim 1, wherein the instructions when executed by the at least one processor further cause the image display apparatus to:
    detect that the vehicle travels on a second road section, wherein the second road section is a downhill road section that is in front of the vehicle and that is predicted based on data from an image sensor of the vehicle; and
    move up a lower boundary of the boundaries and in response to detecting that the vehicle travels on the second road section, wherein a proportion of moving up the lower boundary is based on gravity acceleration and fourth duration, and wherein the fourth duration is a duration for the vehicle to travel through the second road section.

11. The image display apparatus of claim 1, wherein the instructions when executed by the at least one processor further cause the image display apparatus to:
    move a left boundary of the boundaries to the right when, based on the steering wheel angle information, the vehicle turns left, wherein a proportion of moving the left boundary to the right is based on a second rate and a fifth duration, wherein the second rate is a rate the vehicle turns left, and wherein the fifth duration is a duration from a time when the vehicle turns left to a time when the vehicle stops turning left; or
    move a right boundary of the boundaries to the left when, based on the steering wheel angle information, the vehicle turns right, wherein a proportion of moving the right boundary to the left is based on a third rate and a sixth duration, wherein the third rate is a rate the vehicle turns right, and the wherein sixth duration is a duration from a time when the vehicle turns right to a time when the vehicle stops turning right.

12. The image display apparatus of claim 1, wherein the instructions when executed by the at least one processor further cause the image display apparatus to:
    move a left boundary of the boundaries to the right when detecting that the vehicle travels to a third road section, wherein the third road section is a left-turn road section that is in front of the vehicle and that is based on predicted data from an image sensor of the vehicle, wherein a proportion of moving the left boundary to the right is based on a second rate and a fifth duration, wherein the second rate is a rate the vehicle travels to the third road section, and wherein the fifth duration is a duration for the vehicle to travel through the third road section; or
    move a right boundary of the boundaries to the left when detecting that the vehicle travels to a fourth road section, wherein the fourth road section is a right-turn road section that is in front of the vehicle and that is based on predicted data from the image sensor, wherein a proportion of moving the right boundary to the left is based on a third rate and a sixth duration, wherein the third rate is a rate the vehicle travels on the fourth road section, and wherein the sixth duration is a duration for the vehicle to travel through the fourth road section.

13. The image display apparatus of claim 1, wherein the instructions that when executed by the at least one processor further cause the image display apparatus to:
    zoom in the first image within the boundaries based on a third acceleration when, according to a first ADAS instruction, the vehicle travels at the accelerated speed, wherein a zoom-in proportion of the first image is based on the third acceleration and a seventh duration, wherein the third acceleration is based on the first ADAS instruction, wherein the seventh duration is a duration from a time the vehicle travels at the accelerated speed to a time the vehicle travels at a constant speed, and wherein the first ADAS instruction is configured to instruct the vehicle to accelerate;
    zoom out the first image within the boundaries based on a fourth acceleration when, according to a second ADAS instruction, the vehicle travels at the decelerated speed, wherein a zoom-out proportion of the first image is based on the fourth acceleration and an eighth duration, wherein the fourth acceleration is based on the second ADAS instruction, wherein the eighth duration is a duration from a time the vehicle travels at the decelerated speed to a time the vehicle travels at a constant speed, and wherein the second ADAS instruction is configured to instruct the vehicle to decelerate;
    move a left boundary of the boundaries to the right when, according to a third ADAS instruction, the vehicle turns left, wherein a proportion of moving the left boundary to the right is based on a second rate and a fifth duration, wherein the second rate is a rate the vehicle turns left, and wherein the fifth duration is a duration in which the vehicle turns left; or
    move a right boundary of the boundaries to the left when, according to a fourth ADAS instruction, the vehicle turns right, wherein a proportion of moving the right boundary to the left is based on a third rate and a sixth duration, wherein the third rate is a rate the vehicle turns right, and wherein the sixth duration is duration in which the vehicle turns right.

14. An image display method, comprising:
    obtaining motion information of a vehicle, wherein the motion information comprises at least one of first information, an upper-layer advanced driver assistant system (ADAS) instruction, or a predicted motion track of the vehicle, wherein the first information comprises at least one of displacement information of a brake pedal, displacement information of an acceleration pedal, or steering wheel angle information, and wherein the upper-layer ADAS instruction instructs the vehicle to travel at an accelerated speed, to travel at a decelerated speed, or to turn; and
    adjusting a first image that is displayed on a vehicle-mounted display of the vehicle based on the motion information of the vehicle, wherein the first image comprises a plurality of boundaries surrounding the first image, and wherein adjusting the first image comprises moving a first boundary of the boundaries on the vehicle-mounted display without moving a second boundary of the boundaries on the vehicle-mounted display.

15. The image display method of claim 14, wherein the adjusting further comprises performing zooming adjustment on the first image within the boundaries based on the motion information of the vehicle.

16. The image display method of claim 14, wherein the adjusting comprises:
zooming in the first image within the boundaries based on a first acceleration, wherein a zoom-in proportion of the first image within the boundaries is based on the first acceleration and a first duration, wherein the first acceleration is based on the displacement information of the acceleration pedal, and wherein the first duration is a duration from a time when the displacement information of the acceleration pedal is obtained to a time when the vehicle travels at a constant speed.

17. The image display method of claim 14, wherein the adjusting comprises:
zooming out the first image within the boundaries based on a second acceleration, wherein a zoom-out proportion of the first image within the boundaries is based on the second acceleration and a second duration, wherein the second acceleration is based on the displacement information of the brake pedal, and wherein the second duration is a duration from a time when the displacement information of the brake pedal is obtained to a time when the vehicle travels at a constant speed.

18. A computer program product comprising computer-executable instructions that are stored on a non-transitory computer-readable medium and that, when executed by at least one processor, cause an apparatus to:
obtain motion information of a vehicle, wherein the motion information comprises at least one of first information, an upper-layer advanced driver assistant system (ADAS) instruction, or a predicted motion track of the vehicle, wherein the first information comprises at least one of displacement information of a brake pedal, displacement information of an acceleration pedal, or steering wheel angle information, and wherein the upper-layer ADAS instruction instructs the vehicle to travel at an accelerated speed, to travel at a decelerated speed, or to turn; and
adjust a first image that is displayed on a vehicle-mounted display of the vehicle based on the motion information of the vehicle, wherein the first image comprises a plurality of boundaries surrounding the first image, and wherein adjusting the first image comprises moving a first boundary of the boundaries on the vehicle-mounted display without moving a second boundary of the boundaries on the vehicle-mounted display.

19. The computer program product of claim 18, wherein the computer-executable instructions that when executed by at least one processor cause the apparatus to perform zooming adjustment on the first image within the boundaries based on the motion information of the vehicle.

20. The computer program product of claim 18, wherein the computer-executable instructions that when executed by at least one processor cause the apparatus to zoom in the first image within the boundaries based on a first acceleration, wherein a zoom-in proportion of the first image is based on the first acceleration and a first duration, wherein the first acceleration is based on the displacement information of the acceleration pedal, and wherein the first duration is from a time when the displacement information of the acceleration pedal is obtained to a time when the vehicle travels at a constant speed.

* * * * *